United States Patent [19]

Ota et al.

[11] Patent Number: 6,108,065
[45] Date of Patent: *Aug. 22, 2000

[54] PARALLEL FIELD LIQUID CRYSTAL DISPLAY WITH COUNTER ELECTRODES CONNECTED TO THE SCAN LINES

[75] Inventors: Masuyuki Ota, Mobara; Masahiko Ando, Hitachi; Katsumi Kondo, Hitachinaka; Masahito Ohe, Hitachi; Kazuhiko Yanagawa, Mobara, all of Japan

[73] Assignee: Hitachi, Ltd., Tokyo, Japan

[*] Notice: This patent is subject to a terminal disclaimer.

[21] Appl. No.: 09/179,859

[22] Filed: Oct. 28, 1998

Related U.S. Application Data

[63] Continuation of application No. 08/519,101, Aug. 24, 1995, Pat. No. 5,831,707.

[30] Foreign Application Priority Data

Aug. 24, 1994  [JP]  Japan ................................ 6-199247
May 30, 1995  [JP]  Japan ................................ 7-131404

[51] Int. Cl.$^7$ .................................................. G02F 1/136
[52] U.S. Cl. ............................................. 349/141; 349/46
[58] Field of Search ............................. 349/141, 38, 39, 349/111, 44, 46

[56] References Cited

U.S. PATENT DOCUMENTS

| | | | |
|---|---|---|---|
| 4,345,249 | 8/1982 | Togashi | 345/103 |
| 4,386,352 | 5/1983 | Nonomura et al. | 345/92 |
| 4,759,610 | 7/1988 | Yanagisawa | 349/162 |
| 4,984,033 | 1/1991 | Ishizu et al. | 349/111 |
| 5,028,122 | 7/1991 | Hamada et al. | 349/38 |
| 5,266,825 | 11/1993 | Tsukada et al. | |
| 5,576,867 | 11/1996 | Baur et al. | 349/142 |
| 5,598,285 | 1/1997 | Kondo et al. | |
| 5,644,147 | 7/1997 | Yamazaki et al. | |
| 5,773,325 | 6/1998 | Teramoto | 438/151 |
| 5,831,707 | 11/1998 | Ota et al. | 349/141 |
| 5,841,498 | 11/1998 | Baur et al. | 349/141 |

FOREIGN PATENT DOCUMENTS 63-21907  of 1988  Japan .
1-136120  of 1989  Japan .
5-505247  of 1993  Japan .

*Primary Examiner*—Kenneth Parker
*Attorney, Agent, or Firm*—Antonelli, Terry, Stout & Kraus, LLP

[57] ABSTRACT

An active matrix type liquid crystal display apparatus includes a first substrate which has a plurality of scan electrodes and signal electrodes formed in a matrix shape, and a plurality of semiconductor switching elements having enhancement type characteristics formed at corresponding cross points of said scan electrodes and said signal electrodes, respectively, a second substrate which is arranged so as to face to said first substrate, and a liquid crystal layer which is composed of a liquid crystal composition enclosed in an interval between said first and second substrates, wherein pixel electrodes connected to corresponding ones of said semiconductor switching element and counter electrodes connected to corresponding ones of said scan electrodes are arranged alternately in a comb-shape manner in respective ones of plural pixel regions surrounded by said plural scan electrodes and plural signal electrodes on said first substrate.

22 Claims, 29 Drawing Sheets

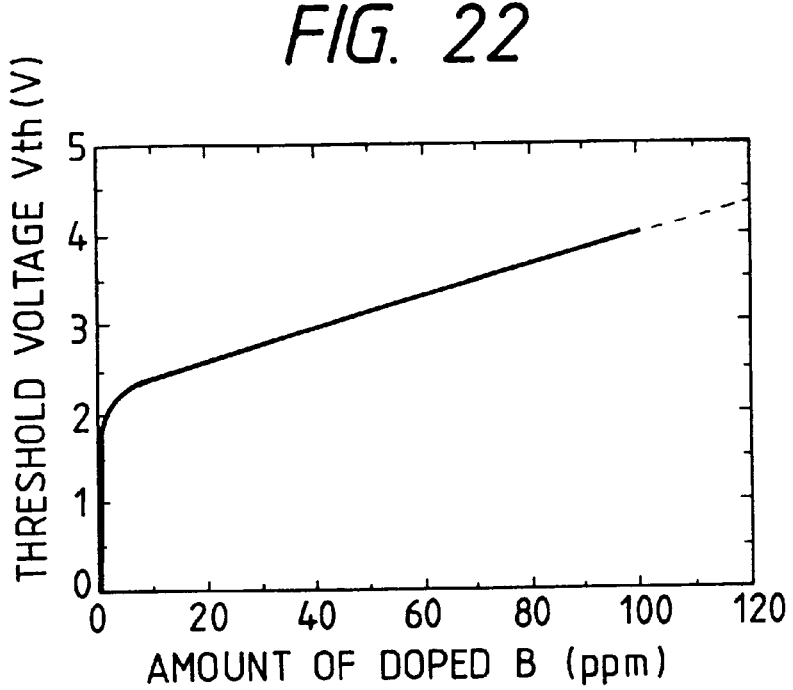
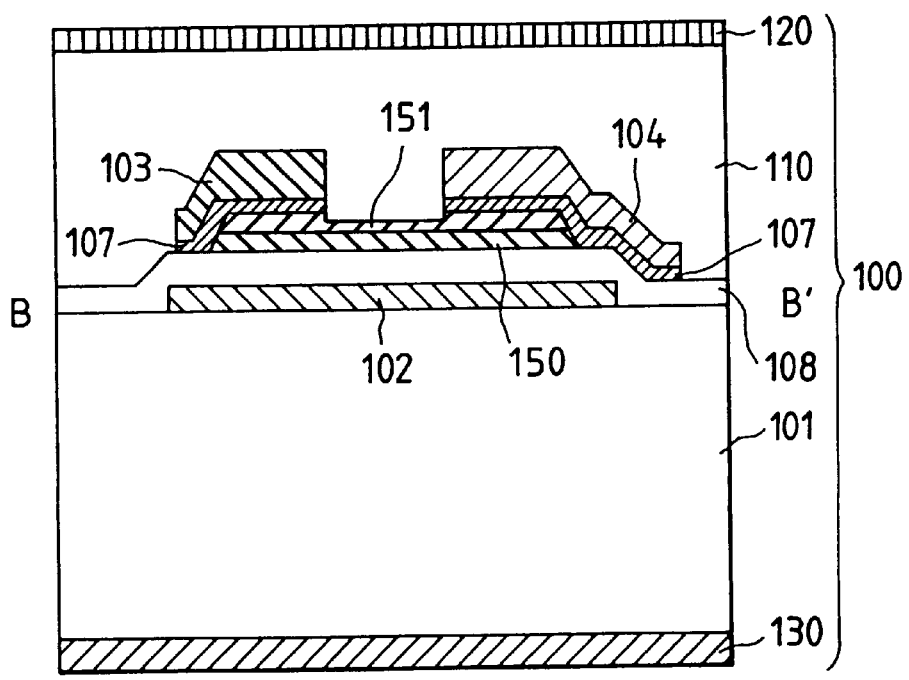

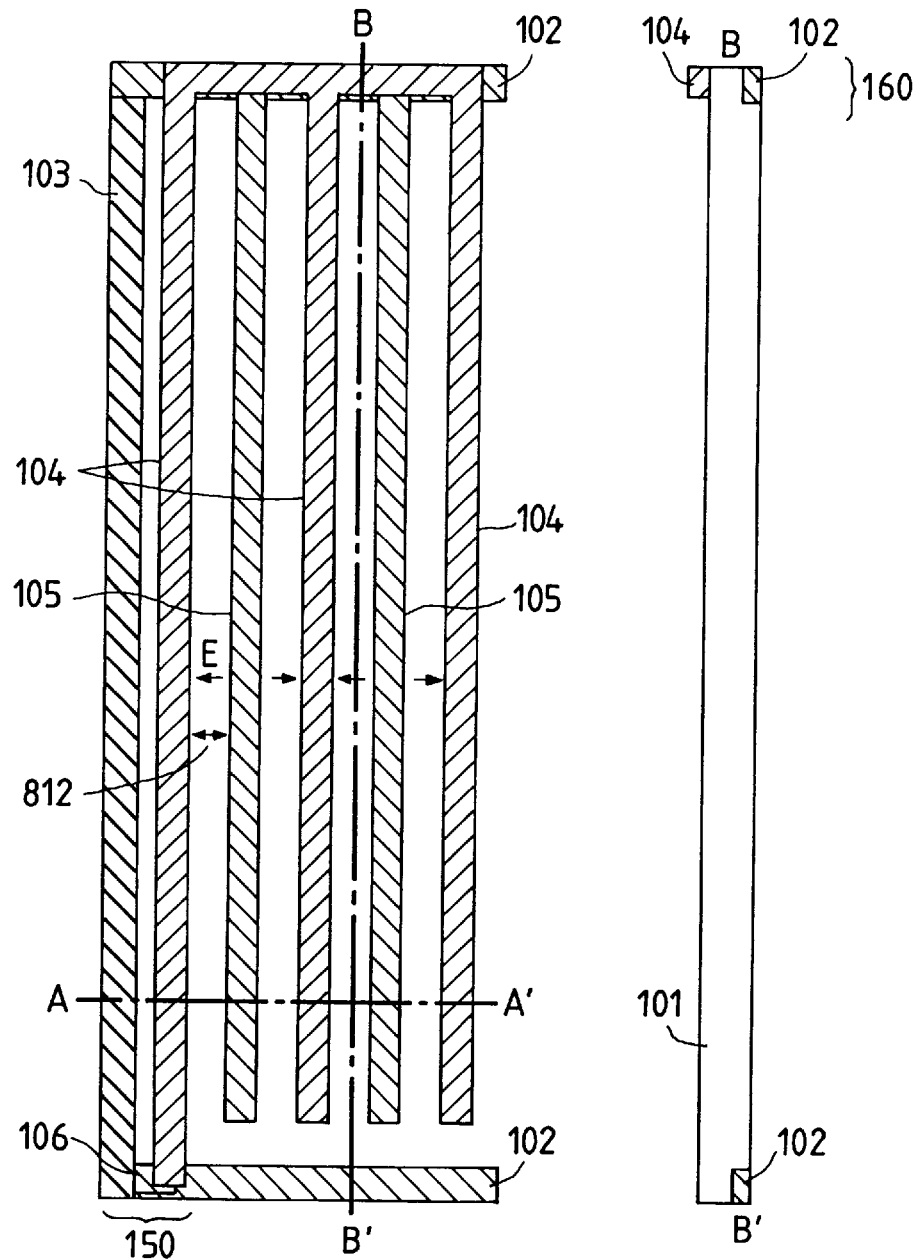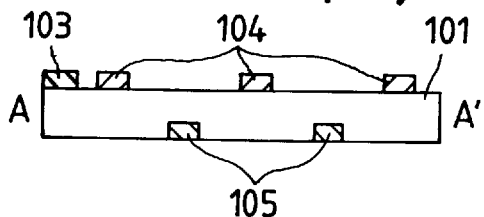

PARALLEL FIELD LIQUID CRYSTAL DISPLAY WITH COUNTER ELECTRODES CONNECTED TO THE SCAN LINES

CROSS REFERENCE TO RELATED APPLICATION

This is a continuation of U.S. application Ser. No. 08/519,101, filed Aug. 24, 1995, now U.S. Pat. No. 5,831,707, the subject matter of which is incorporated by reference herein.

BACKGROUND OF THE INVENTION

The present invention relates to an active matrix type liquid crystal display apparatus.

The active matrix type liquid crystal display apparatus using active elements represented by a thin film transistor (TFT) is becoming popular as display terminals of office automation (OA) apparatus and other equipment in view of the fact that it is thin, light weight, and has a high image quality comparable to a Braun tube. The display type of liquid crystal display apparatus can be divided roughly into two categories. The one is a type wherein the liquid crystal is held between two substrates whereon transparent electrodes are formed, the liquid crystal is operated by voltage applied to the transparent electrodes, and an image is displayed by modulating incident light into the liquid crystal through the transparent electrodes. All of the various makes of liquid crystal display apparatus used widely at the present time adopt the above described display type. The other one is a type wherein the liquid crystal is operated by an electric field which is disposed in parallel to a substrate plane between two electrodes composed on the similar substrate, and an image is displayed by modulating incident light into the liquid crystal through a gap between the two electrodes. That display type has not been adopted in any apparatus yet, but it has preferable features, such as wide viewing-angles, a low load capacitance, and other desirable characteristics; and accordingly, the technology of the latter display type is promising in the field of active matrix type liquid crystal display apparatuses. The above feature are disclosed in JP-T-5-505247 (1993), and JP-B-63-21907 (1988).

However, the display type wherein the liquid crystal is operated by an electric field which is approximately in parallel with the substrate has problems, such as a small aperture area for transmitting light, a dark image display, and a requirement for bright back light with high power consumption in order to solve the dark image display problem, because opaque electrodes are composed in a comb-teeth shape. Therefore, it is necessary to decrease the number of electrodes and wiring to connect the electrodes as much as possible in order to extend the aperture area, that is, to improve the aperture ratio. When an electrode having a different potential from that of the two electrodes approaches the two electrodes controlling the orientation of the liquid crystal, the orientation of the liquid crystal is disturbed, and an orientation failure domain is generated. As the result, the effective aperture area decreases, and a problem, such as a decrease in the aperture ratio, is generated. Therefore, it is necessary to decrease the orientation failure domain, and to increase the effective aperture ratio.

SUMMARY OF THE INVENTION

The present invention solves the above problems, and one of the objects of the present invention is to provide an active matrix type liquid crystal display apparatus having a high aperture ratio, which uses the latter display mode.

Further, the other object of the present invention is to provide an active matrix type liquid crystal display apparatus which is prevented from generating orientation failure domains.

In accordance with the active matrix type liquid crystal display apparatus of the present invention, a plurality of scan electrodes, a plurality of signal electrodes crossing the plurality of the scan electrodes in a matrix shape, a plurality of semiconductor switching elements formed at respective corresponding crossing points of the plurality of the scan electrodes and the plurality of the signal electrodes, a plurality of pixel electrodes connected respectively to respective ones of the plurality of the switching elements, and a plurality of counter electrodes connected respectively to respective ones of the plurality of the scan electrodes, are formed on a substrate.

The plural pixel electrodes and the plural counter electrodes are respectively arranged in respective regions surrounded by the plural scan electrodes and the plural signal electrodes. An alternating voltage having substantially symmetrical positive and negative values with respect to a non-selective voltage level of the scan voltage taken as a standard is applied to the pixel electrodes corresponding to respective ones of the plural switching elements.

The semiconductor switching element is preferably a thin film transistor element having enhancement type characteristics. The absolute value of the threshold value $V_{th}$ of the thin film transistor element is desirably made to exceed the absolute value of the maximum voltage $V_{ON}$ applied to the liquid crystal layer for making the transmittance (transmissivity) of light at the liquid crystal layer a maximum, or, to exceed ½ of the difference between the maximum voltage $V_{ON}$ and the minimum voltage $V_{OFF}$ which are applied to the liquid crystal layer for making the transmittance (transmissivity) of light at the liquid crystal layer maximum and minimum, respectively.

In accordance with the state of the active matrix type liquid crystal display apparatus of the present invention, the substrate whereon the semiconductor switching elements are formed has a passivation film to protect the semiconductor switching elements, and back plane electrodes formed on the passivation film corresponding to the respective semiconductor switching elements. Otherwise, the substrate whereon the plural semiconductors are formed has back plane electrodes which are formed under the semiconductor switching element with an insulating film being disposed therebetween. The back plane electrodes are preferably arranged along the scan electrodes.

Further, in accordance with the state of the active matrix type liquid crystal display apparatus of the present invention, the substrate whereon the plural semiconductor switching elements are formed has a passivation film to protect the semiconductor switching elements, and impurities are ion-implanted on the passivation film. Otherwise, the substrate whereon the plural semiconductor switching elements are formed has an insulating film under the semiconductor switching elements, and impurities are ion-implanted on the insulating film.

Furthermore, in accordance with the state of the active matrix type liquid crystal display apparatus of the present invention, the substrate has plural semiconductor switching elements having enhancement type characteristics which are formed at points corresponding to respective crossing points of the plural scan electrodes and the plural signal electrodes which are arranged in a matrix shape. In respective ones of plural pixel regions surrounded by the plural scan electrodes and the plural signal electrodes on the substrate, the pixel electrode connected to the corresponding semiconductor switching element and the counter electrode connected to the corresponding scanning line are arranged alternately in a comb-teeth shape. As for the semiconductor switching element, a thin film transistor element is preferable.

In accordance with the state of the thin film transistor element, acceptors or donors are doped in an activated layer of thin film transistors. Moreover, the semiconductor activated layer is composed of an amorphous silicon film.

Further, In accordance with the state of the thin film transistor element, the gate electrode is shifted toward the source electrode or the drain electrode. Otherwise, a gap may be added to the gate electrode.

The active matrix type liquid crystal display apparatus is driven by switching the active elements, for applying a voltage to the liquid crystal, and charging and maintaining the voltage on the pixel electrodes, which are divided and formed in a matrix shape.

In accordance with the present invention, a counter electrode is connected to a scan electrode, firstly. Therefore, the role of the wiring for the counter electrode to supply a voltage to the counter electrode from an external power supply can be performed by the scan electrode, and the wiring for the counter electrode can be omitted. Secondly, an alternating voltage having symmetrical positive and negative values with respect to the non-selective voltage level of the scan voltage, serving as a standard, is applied to the pixel electrode. As for the switching element to apply the alternating voltage to the pixel electrode, a transistor having enhancement type characteristics is formed and used. Accordingly, a voltage having a negative polarity with respect to the non-selective voltage level of the scan voltage, which has been charged to the level of the pixel electrode in the above second step, can be maintained. Therefore, an alternating voltage having symmetrical positive and negative values with respect to the non-selective voltage levels of the scan voltage, operating as a standard, can be applied to and maintained at the pixel electrode, and the alternating voltage can be applied to the liquid crystal.

In accordance with the above first step, the wiring for the counter electrode becomes unnecessary. Therefore, the region previously used for the wiring can be utilized as an aperture region, and the aperture ratio can be improved significantly. However, a conventional active matrix type liquid crystal display apparatus can not be driven by an alternating voltage if the voltage at the counter electrode (counter voltage) is coincident with the non-selective voltage level of the scan voltage, although the apparatus can be driven by a direct voltage. However, the liquid crystal is deteriorated remarkably by a steady current flowing in the liquid crystal layer if the liquid crystal is driven by a direct voltage, and the life of the apparatus is shortened significantly. Therefore, in the above second step, the liquid crystal can be driven by an alternating voltage even if the non-selective level of the scan voltage is used as the counter voltage (in other words, even if the counter voltage coincides with the non-selective voltage level) in order to improve the life of the liquid crystal display apparatus.

Hereinafter, an explanation will be given as to why the liquid crystal can be driven by an alternating voltage in accordance with the present invention, even if the non-selective voltage level of the scan voltage is used as the counter voltage.

Almost all of the transistor elements used as representative active elements in the conventional active matrix type liquid crystal display apparatus have a characteristic where the drain current starts to flow in the vicinity of 0 volt of the gate voltage (Ref. FIG. 6, 502), that is, the gate threshold voltage $V_{th}$ is close to 0 volt. Therefore, if the non-selective voltage level of the scan voltage is used as the counter voltage, a voltage having a negative polarity with respect to the counter voltage (non-selective voltage) can not be maintained even if the voltage is chargeable. This is because the non-selective voltage ($V_{G1}$) of the scan voltage has a higher potential than the pixel voltage ($V_{SL}$) (Ref. 9 FIG. 10(c), (d)), and the transistor element maintains a conductive condition even in the non-selective period. Accordingly, in order to drive the liquid crystal using an alternating voltage, the counter electrode must be provided separately so as to set the counter voltage higher (in case of having n-type characteristics) than the non-selective voltage level of the scan voltage.

Therefore, if a transistor having enhancement type characteristics wherein a sufficiently large gate threshold voltage $V_{TH}$ is used according to the present invention, a voltage of negative polarity can be maintained at the pixel electrode because the transistor is in a non-conductive condition even if the non-selective voltage level of the scan voltage is somewhat higher than the pixel voltage. Consequently, the liquid crystal can be driven by an alternating voltage.

Accordingly, the active matrix type liquid crystal display apparatus which is capable of being driven by an alternating voltage having a preferable aperture ratio and a preferable life can be obtained.

Further, the second step has another advantage. When an electrode having another potential is close to a pair of electrodes which control orientation of the liquid crystal, the orientation of the liquid crystal is disturbed, and an orientation failure domain is generated. However, in accordance with the second step, the orientation failure does not occur because the potentials of the counter electrode and the scan electrode coincide with each other in almost all of the period, and any unnecessary potential is not applied to the liquid crystal in a region between the counter electrode and the scan electrode. Therefore, the effective aperture region is not necessarily decreased, and the effective aperture ratio can be improved. Further, the deterioration of the liquid crystal in the region between the signal electrode and the scan electrode can be decreased because the direct voltage applied to the above region can be moderated remarkably.

In accordance with the above effects, the active matrix type liquid crystal display apparatus having no orientation failure domain and an improved effective aperture ratio can be obtained.

BRIEF DESCRIPTION OF THE DRAWINGS

These and other objects, features, and advantages of the present invention will be understood more clearly from the following detailed description with reference to the accompanying drawings, wherein:

FIG. 22 is a graph indicating a relationship between the amount of doped B and the threshold voltage of a thin film transistor element in accordance with this invention;

FIG. 23 is a schematic cross sectional view indicating the cross sectional structure of a thin film transistor element in accordance with this invention;

FIG. 37(a) is a plan view, FIG. 37(b) is a side view and FIG. 37(c) is an end view for explaining the composition of the pixel portion of the present invention.

DESCRIPTION OF THE PREFERRED EMBODIMENTS

The liquid crystal display apparatus relating to the present invention comprises a liquid crystal display panel which is composed of a glass substrate whereon thin film transistor elements and other components are formed, a glass substrate whereon color filters are formed, a liquid crystal composition which is enclosed between the above two glass substrates, and a driving circuit which is connected to the liquid crystal display panel for generating a voltage to be applied to the liquid crystal.

Hereinafter, embodiments of the present invention will be explained in detail.

Figure 1:
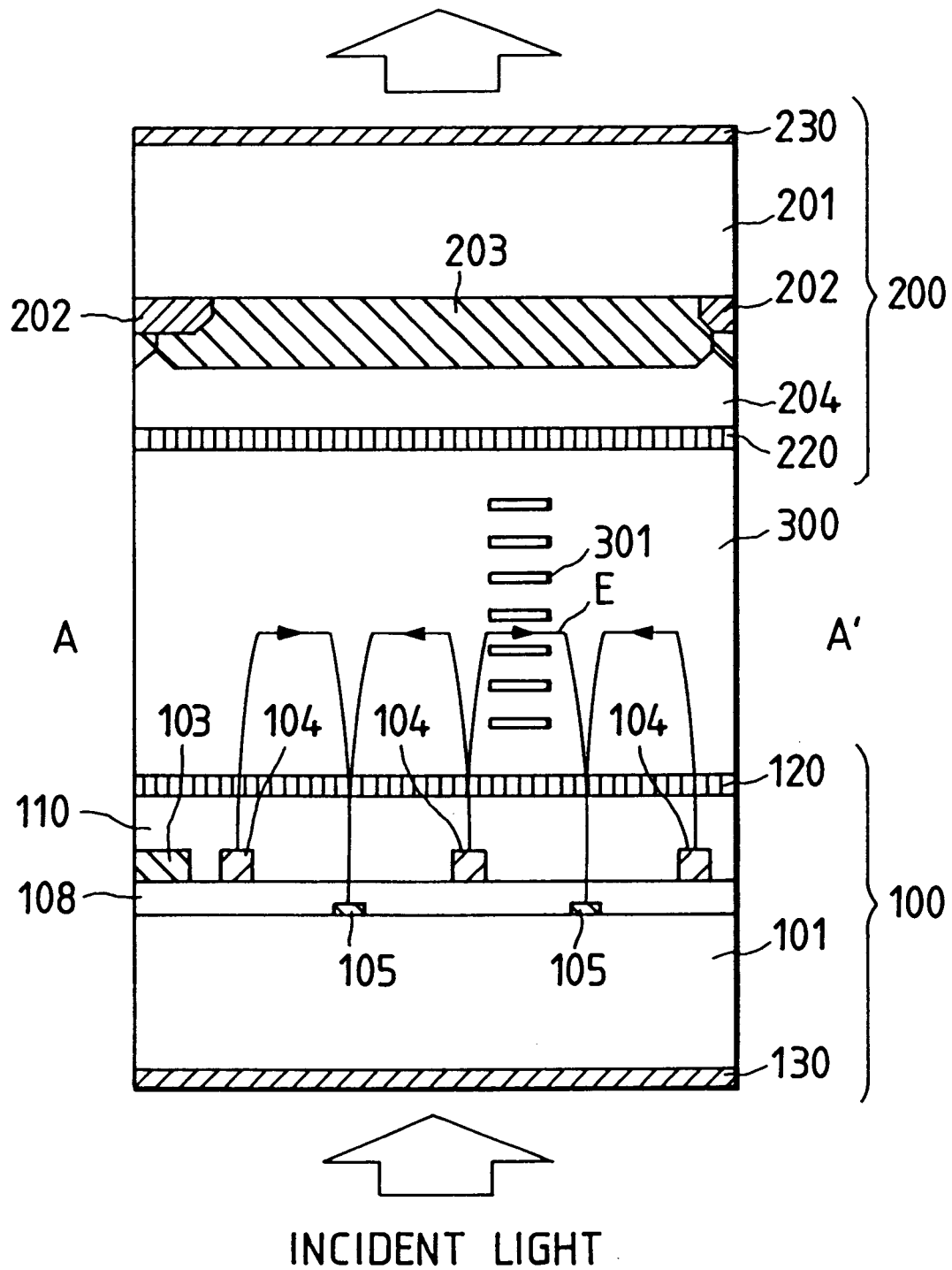
FIG. 1 is a schematic cross sectional view taken along the line A–A' in FIG. 2 indicating a cross sectional structure of the pixel portion of the present invention.
Figure 2:
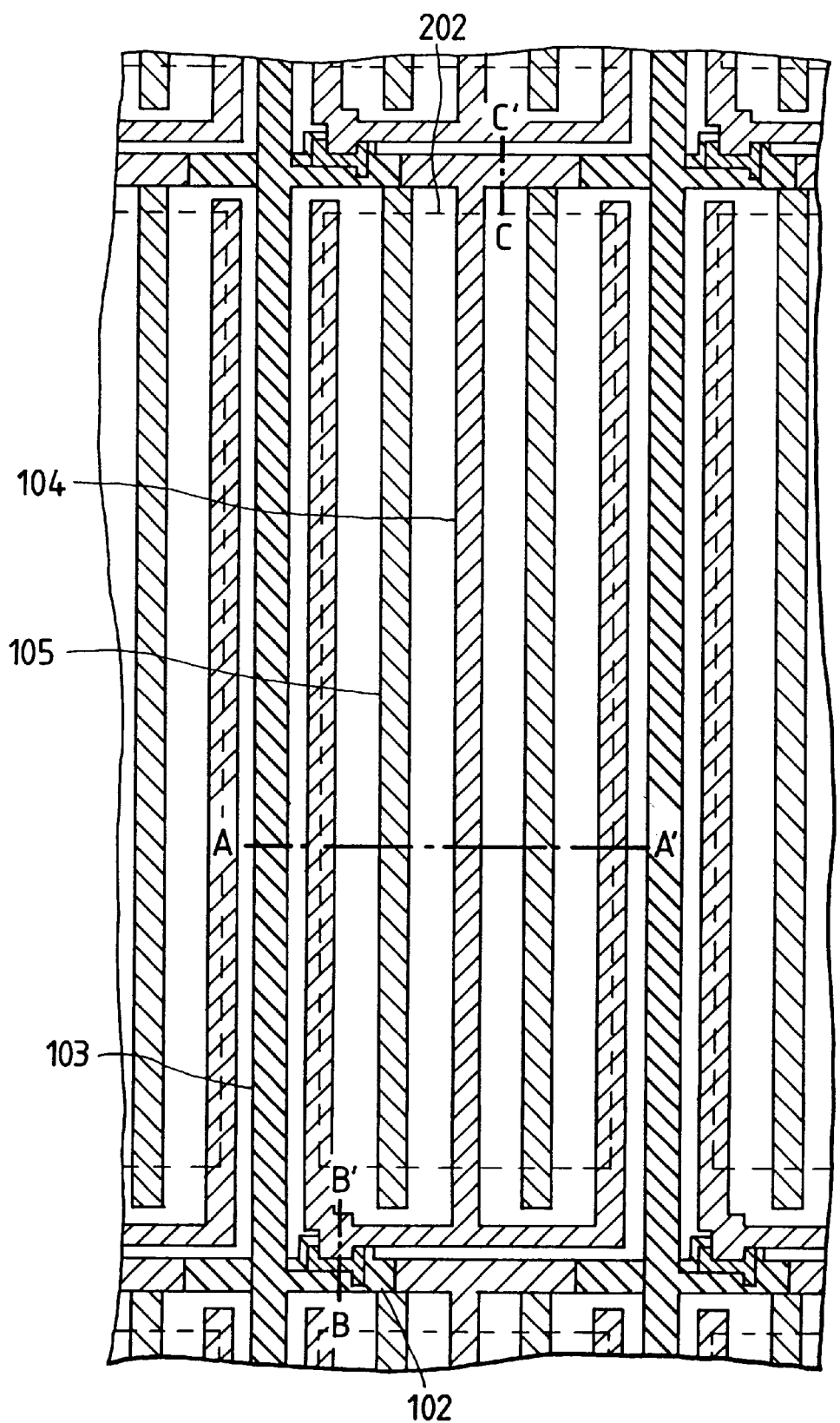
FIG. 2 is a partial plane view indicating the composition of the pixel portion of FIG. 1.
Figure 3:
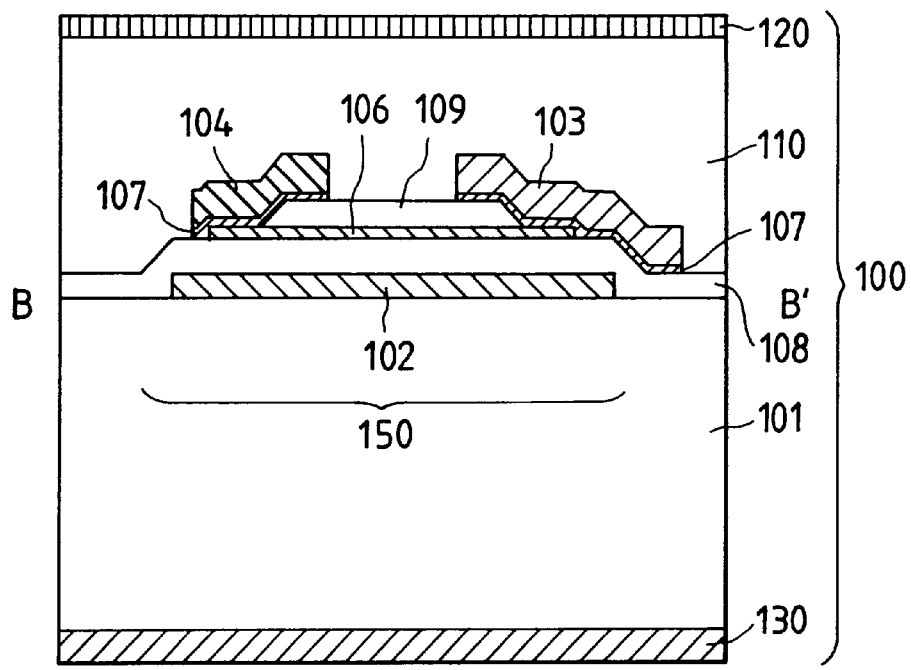
FIG. 3 is a schematic cross sectional view taken along the line B–B' in FIG. 2 indicating a cross sectional structure of the pixel portion.
Figure 4:
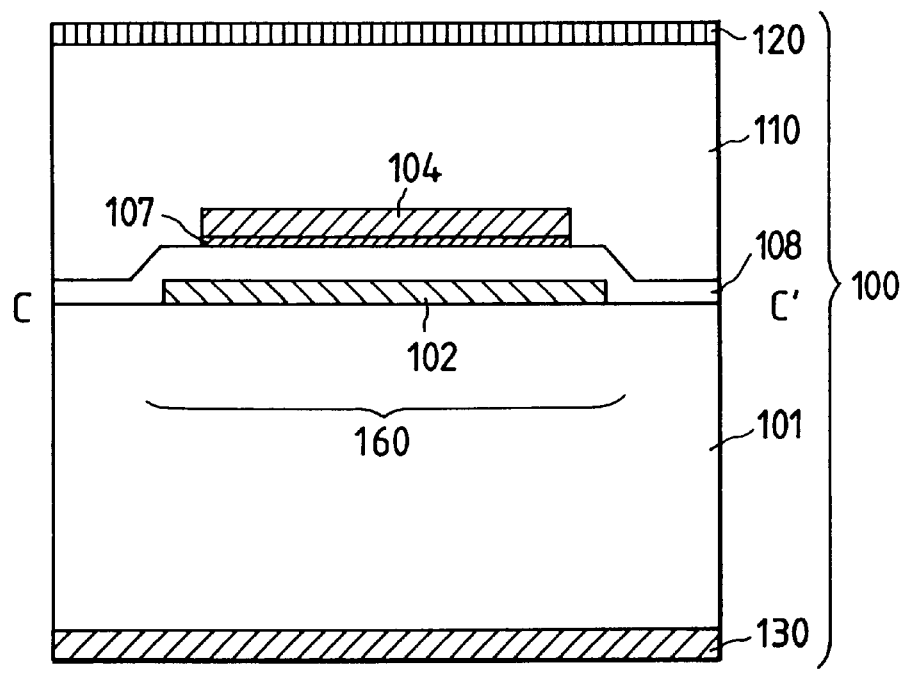
FIG. 4 is a schematic cross sectional view taken along the line C–C' in FIG. 2 indicating a cross sectional structure of the pixel portion.

As for the substrates, two transparent glass substrates 101, 201 of 1.1 mm thicknesses are used, the surfaces of which are polished. Thin film transistors are formed on one of the substrates, e.g. the substrate 101. The structures of the thin film transistors and various electrodes which have been formed in the present embodiment are shown in FIGS. 1–4. FIG. 2 is a partial plane view indicating the structure of a pixel, FIG. 1 is a cross sectional view taken along the line A–A' in FIG. 2, FIG. 3 is a cross sectional view taken along the line B–B' in FIG. 2, and FIG. 4 is a cross sectional view taken along the line C–C' in FIG. 2.

As shown in FIG. 1, the orientation of the liquid crystal molecules 301 in the liquid crystal layer 300 is controlled by an electric field E between a pixel electrode 104 and a counter electrode 105 for modulating incident light between the pixel electrode 104 and the counter electrode 105 and outgoing light. A pixel comprises a group of electrodes, including a scan electrode 102, a signal electrode 103, a pixel electrode 104 and a counter electrode 105, a thin film transistor element 150, and an auxiliary capacitance element 160, as shown in FIG. 2. The thin film transistor 150 comprises the pixel electrode 104 (source electrode), the signal electrode 103 (drain electrode), the scan electrode 102 (gate electrode), and a semiconductor layer 106 made of amorphous silicon, as shown in FIG. 3. The thin film transistor element 150 in the present embodiment has a staggered structure. The auxiliary capacitance 160 has a structure wherein a gate insulating film 108 is held between the pixel electrode 104 and the scan electrode 102 in the preceding line, as shown in FIG. 4.

In accordance with the present invention, the scan electrode 102 and the counter electrode 105, and the signal electrode 103 and the pixel electrode 104, are respectively formed on the same metallic layer. In order to make ohmic contact between the amorphous silicon 106 and the signal electrode 103, and between the amorphous silicon 106 and the pixel electrode 104, ohmic contact layers 107 composed of n+ type amorphous silicon doped with phosphorus are formed. The respective widths of the signal electrode 103, the pixel electrode 104, and the counter electrode 105 are 10 $\mu$m, 6 $\mu$m, and 6 $\mu$m. And, a gap between the pixel electrode 104 and the counter electrode 105 is formed by dividing the interval in four so that an electrode gap $d_{SG}$ between the pixel electrode 104 and the counter electrode 105 becomes 15 $\mu$m. In accordance with the present embodiment, the counter electrode 105 is connected to the scan electrode 102 in the preceding line, as shown in FIG. 2, and the scan electrode 102 operates as the counter electrode wiring. Accordingly, a region previously used for the counter electrode wiring could be used as an aperture portion, and so the aperture ratio can be increased significantly.

On the other substrate 201, a low conductive shielding layer (black matrix) 202 is formed in gap portions, other than the gap between the pixel electrode 104 and the counter electrode 105, in order to improve contrast, whereon color filters 203 of three primary colors, such as R (red), G (green), and B (blue), are formed in a stripe pattern. On the color filter, a transparent resin 204 for flattening the surface is overcoated.

Figure 36:
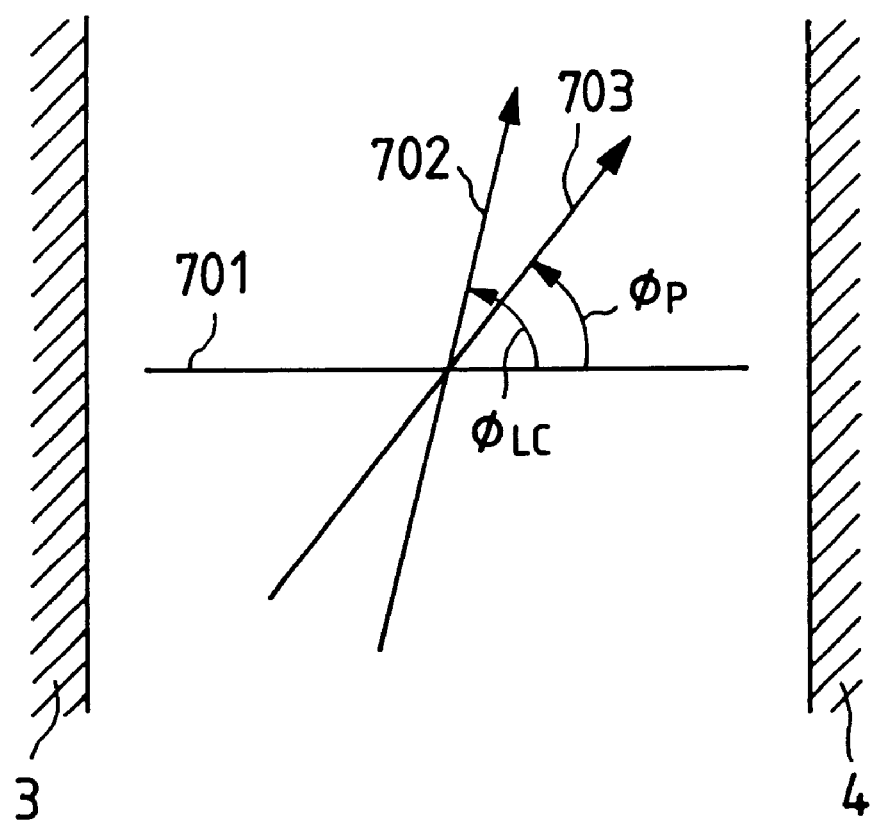
FIG. 36 is a diagram indicating an angle of a molecular longitudinal orientation direction on boundaries of substrate planes (a rubbing direction) $\phi_{LC}$ and an angle of polarizing axis direction $\phi_P$ of the polarizer to an electric field direction.

Orientation films 120, 220 are formed on the inner surface of the two substrates, and after rubbing treatment, the liquid crystal composition 300 is enclosed between the two substrates. The liquid crystal panel is composed by disposing the two substrates enclosing the liquid crystal composition between two polarizers 130, 230. In the present embodiment, polyamide was used for the orientation film. Respective directions of rubbing at top and bottom surfaces were approximately in parallel with each other, and an angle to the direction of an applied electric field was set as 85 degrees ($\phi_{LC1}=\phi_{LC2}=85°$). As for the liquid crystal composition 300, a nematic liquid crystal composition having a positive dielectric anisotropy $\Delta C$ of 7.3 (1 KHz) and an anisotropy of refractive index $\Delta n$ of 0.073 (589 nm, 20° C.) was used. The gap between the substrates d was maintained by holding dispersed spherical beads of 4.1 $\mu$m in a liquid crystal enclosing condition. The polarizer G1220DU made by Nitto Denko Co. was used. A polarized light transmitting axis of one of the two polarizers was set to be the same angle as the rubbing direction, that is, $\phi_{P1}=85$ (that is, $\phi_{LC1}=\phi_{P1}$), and another axis was set to be perpendicular to the above axis, that is, $\phi_{P2}=-5°$ (a relationship among the direction of the applied electric field, the rubbing direction, and the polarized light transmitting axis is shown in FIG. 36).

Figure 5:
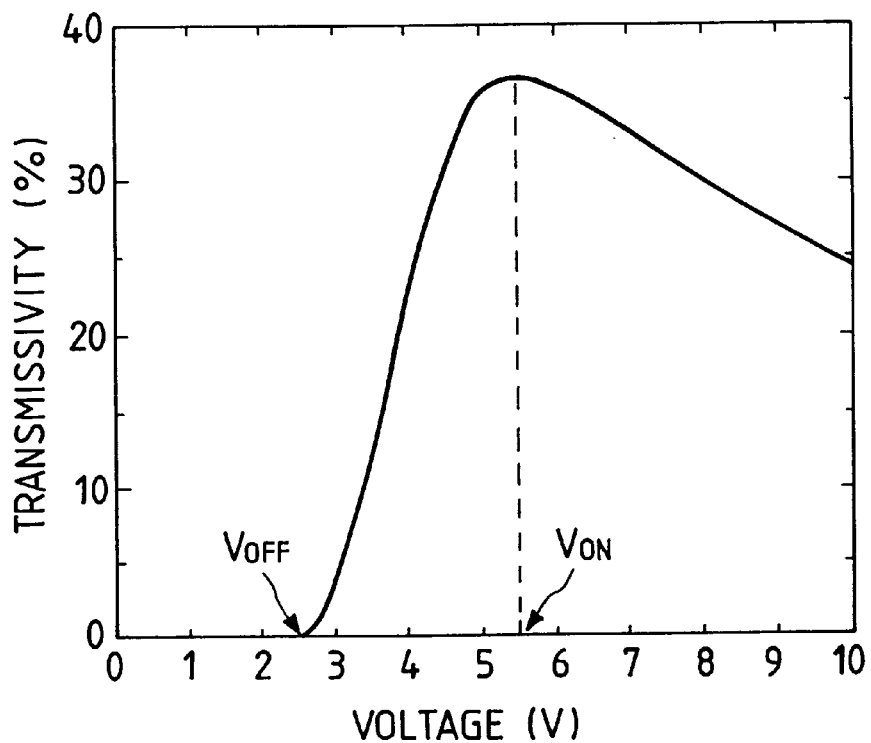
FIG. 5 is a graph indicating an electro-optical characteristics of the device of FIG. 1.

In accordance with the above described composition, normally closed characteristics, that is, a dark condition at low voltage and a bright condition at high voltage, as shown in FIG. 5, was obtained when a voltage is applied between the pixel electrode 104 and the counter electrode 105. In the present embodiment, a voltage $V_{OFF}$ for obtaining minimum transmittance and a voltage $V_{ON}$ for obtaining maximum transmittance were respectively set as 2.6 V and 5.5 V taking the contrast ratio as 100:1.

In order to make the characteristics of the thin film transistor in the present embodiment corresponding to the complete enhancement type, the structure explained hereinafter was composed. The gate electrode (scan electrode 102) of the thin film transistor was made of aluminum, and the gate insulating film 108 was made of silicon nitride film. The silicon nitride film was 350 nm thick and the amorphous silicon 106 was 15 nm thick. In the present embodiment, complete enhancement type characteristics were obtained by making the thickness of the amorphous silicon 106 thin. On account of the thinness, such as 15 nm, an etching stopper 109 was provided in order to avoid elimination of the amorphous silicon 106 when etching channels. In accordance with the above composition, a drain current $I_D$-gate voltage $V_G$ characteristics, as shown by a curve 501 in FIG. 6(a), was obtained. The gate threshold voltage $V_{TH}$ of the thin film transistor was revealed as 9.3 V from FIG. 6(b).

Although there are many parameters in controlling the gate threshold voltage $V_{TH}$ of the thin film transistor, complete enhancement type characteristics were obtained in the present embodiment by making the thickness of the amorphous silicon film very thin so as to shift the gate threshold voltage to the high voltage side. Further, for the thin film transistor element of the present embodiment, inverse of the subthreshold slope, s=$dV_G$/d log ($I_D$), was 0.9, and the maximum value of the gate voltage $V_G$ for maintaining a non-conductive condition less than the drain current $I_D$ of $1\times10^{-13}$ A was 5.7 V. Therefore, with the transistor element of the present embodiment, the maximum voltage $-V_{ON}$ of negative polarity which is applicable to the liquid crystal is 5.7 V, and the voltage to be applied to the liquid crystal layer for obtaining the bright condition in the composition in the present embodiment is 5.5 V, as stated previously. Accordingly, the maximum voltage (−5.5 V) of negative polarity, taking the nonselective voltage level of the scan voltage as a standard, can be sufficiently retained at the pixel electrode during the non-selective period. The inverse of the subthreshold slope s varies depending on the characteristics of the transistor. However, if the difference between the gate threshold voltage $V_{TH}$ (9.3 V) and the maximum value (5.7 V) of the gate voltage $V_G$ for maintaining a non-conductive condition less than the drain current $I_D$ of $1\times10^{-13}$ A is defined as a margin voltage $V_M$ (3.6 V:$V_M$=4s), a condition wherein the voltage of negative polarity is sufficiently retainable and operable becomes $V_{TH}>|V_{ON}|+V_M$ (9.1 V).

Figure 6A:
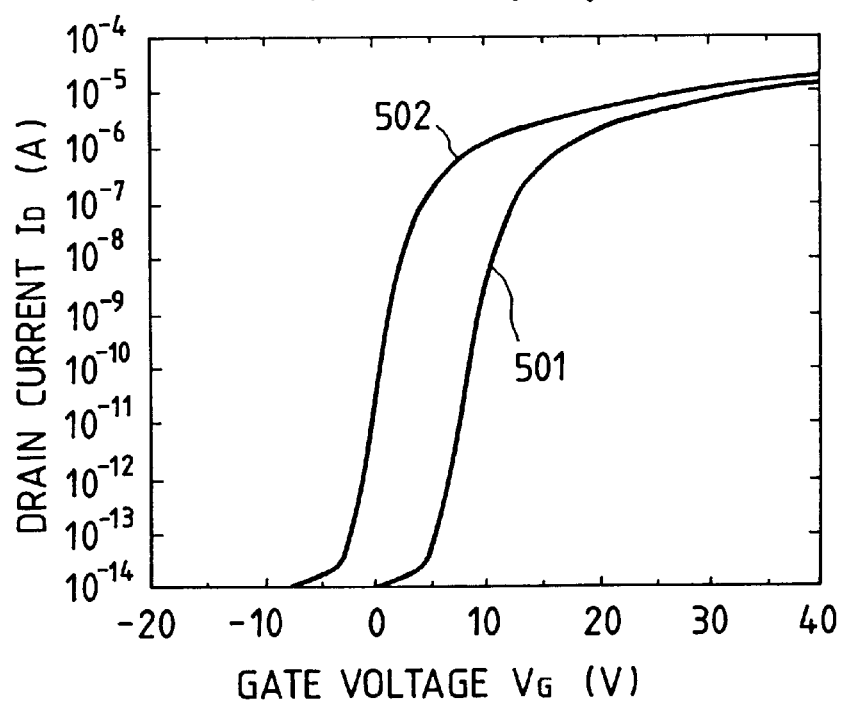
FIGS. 6(a) and (b) are graphs indicating electric characteristics of the transistor element in the device of FIG. 1((a): $I_D$-$V_G$ characteristics, (b): gate threshold voltage ($V_{TH}$))
Figure 6B:
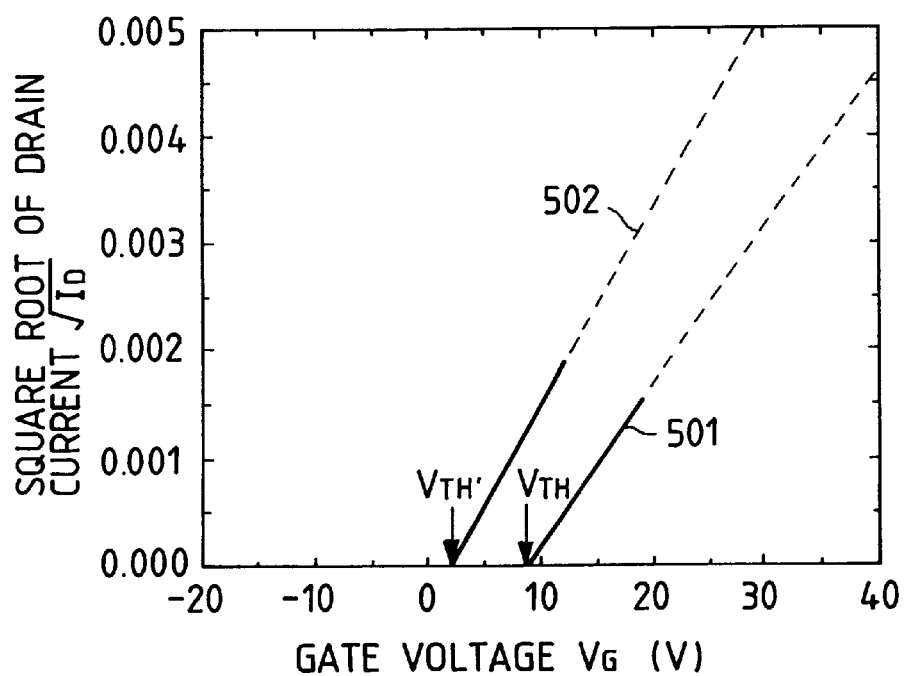

The gate threshold voltage $V_{TH}$ is defined as a gate voltage $V_G$ at a cross point of the gate voltage $V_G$ axis and a line obtained by plotting the square root of the drain current $\sqrt{I_D}$ versus the gate voltage $V_G$ in a range of $V_{TH}<V_G<V_D+V_M$ in FIG. 6(a), and performing a linear approximation.

Figure 7:
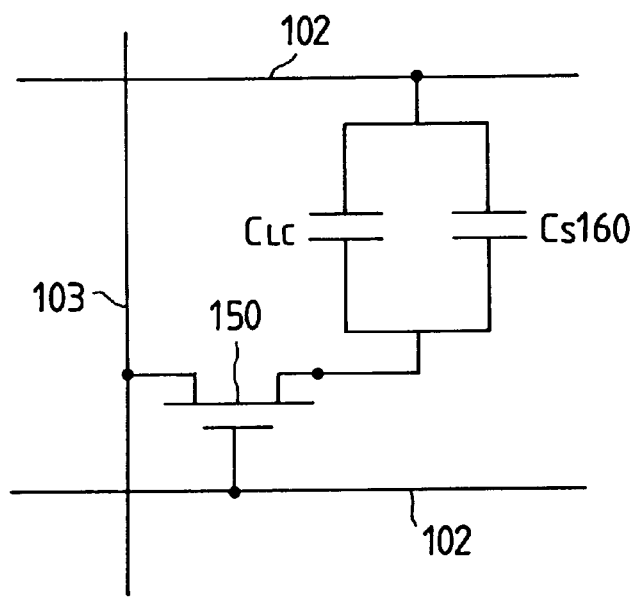
FIG. 7 is an equivalent circuit diagram of the liquid crystal panel in the device of FIG. 1.
Figure 8:
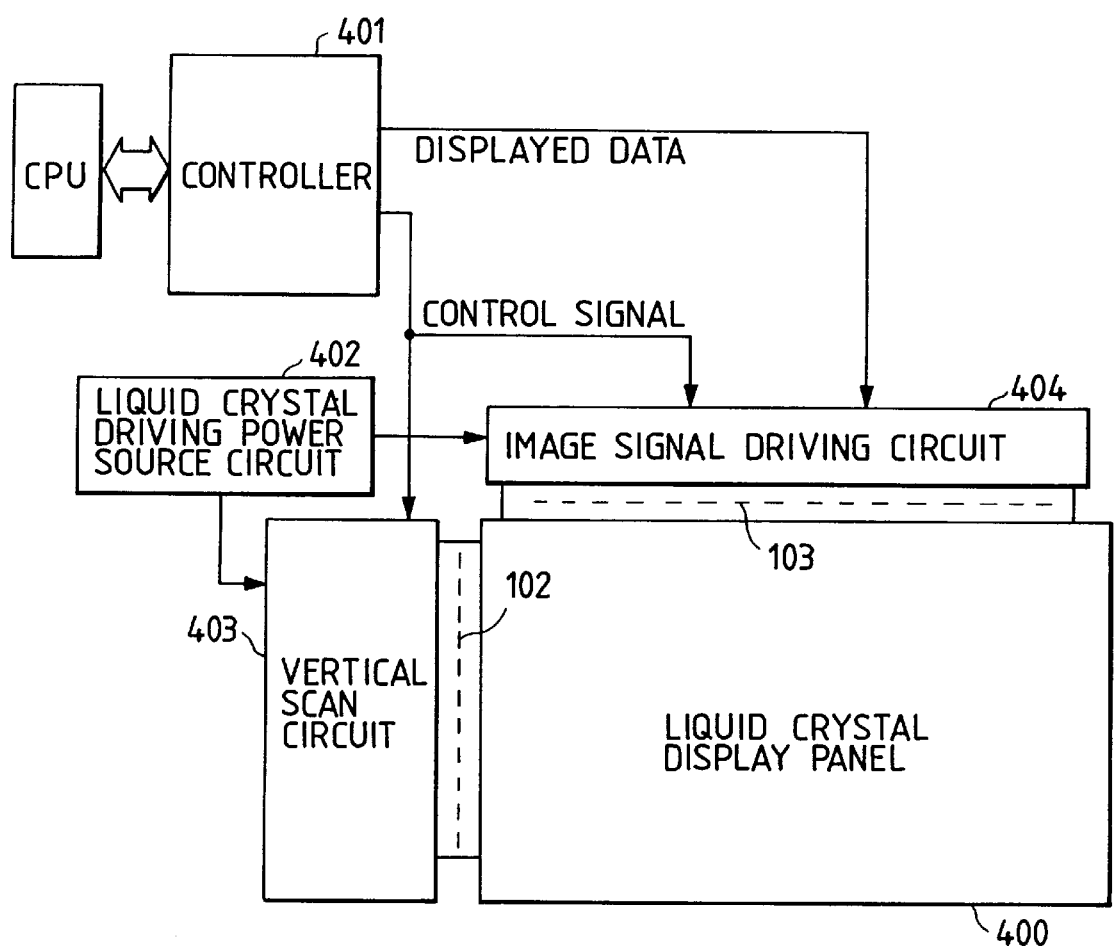
FIG. 8 is a block diagram of the liquid crystal display apparatus of FIG. 1.

Next, a driving method of the present invention will be explained hereinafter. An equivalent circuit of a pixel in the liquid crystal display panel of the present embodiment is shown in FIG. 7, and the system composition of the present embodiment is shown in FIG. 8. In accordance with the present invention, the image signal from a host is received by a controller 401, the image signal is converted to a control signal and display data for a thin film transistor type liquid crystal display apparatus, a vertical scan circuit 403 and an image signal driving circuit 404 select a power source voltage which is supplied from a liquid crystal driving power source circuit 402 based on the control signal and the display data, and a scan voltage and a signal voltage are generated by the vertical scan circuit 403 and the image signal driving circuit 404, respectively, and are supplied to a liquid crystal display panel 400.

Figure 9:
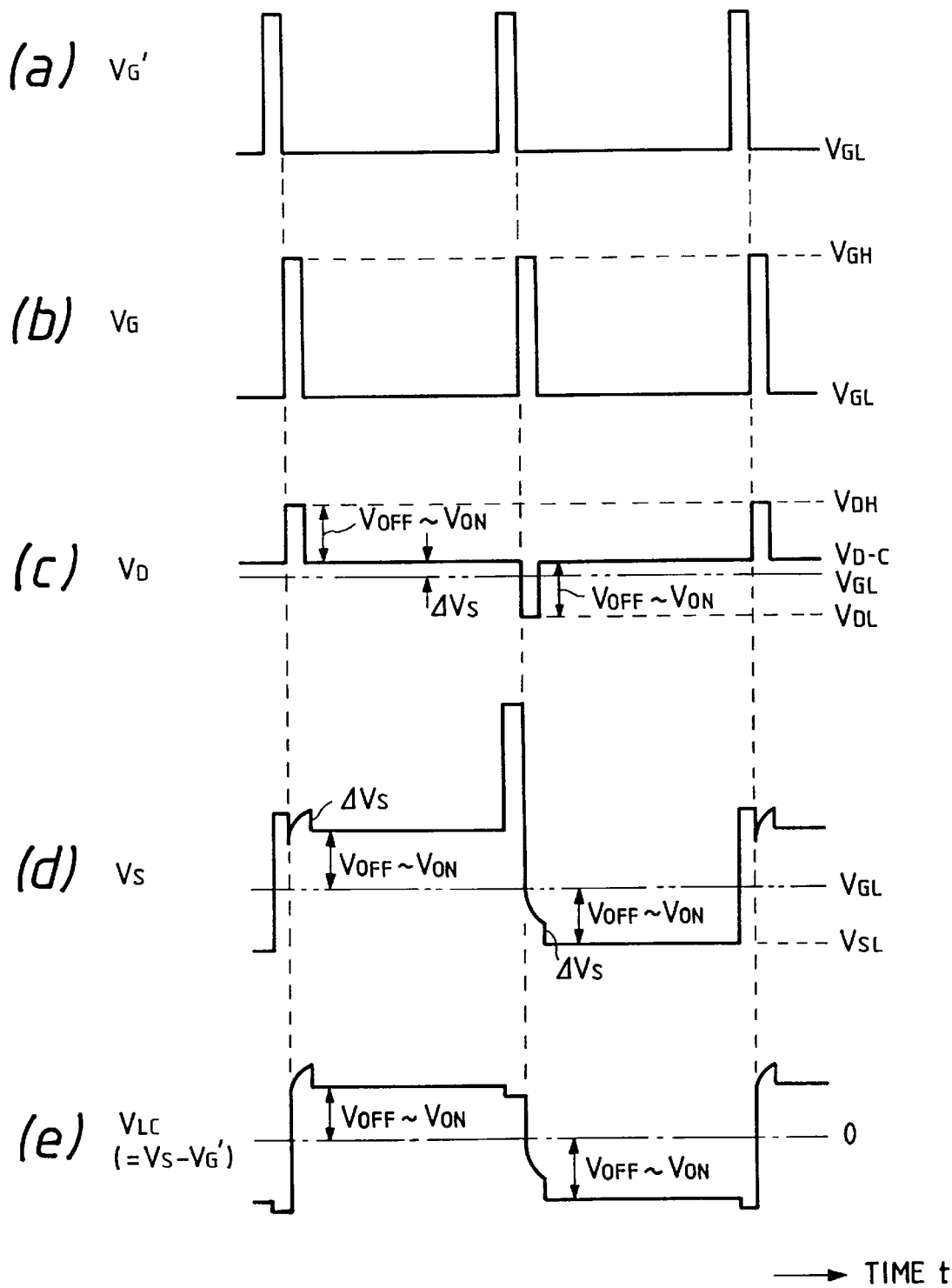
FIG. 9 is a diagram indicating waveforms of the driving voltage in the device of FIG. 1.

The driving wave form of the present embodiment is shown in FIG. 9. A scan voltage $V_G'$ at the scan electrode in the preceding line is shown in FIG. 9(a), a scan voltage $V_G$ which is applied to the scan electrode 102 in FIG. 7 is shown in FIG. 9(b), and a signal voltage $V_D$ which is applied to the signal electrode 103 in FIG. 7 is shown in FIG. 9(c). A pixel voltage $V_S$ (source voltage) at the same time as above is shown in FIG. 9(d), and a voltage applied to the liquid crystal layer is shown in FIG. 9(e). The scan voltage $V_G$ is composed of a selective voltage level and a nonselective voltage level. And, the pulse width of the selective voltage level, repeating cycle, the selective voltage level $V_{GH}$ and the non-selective voltage level $V_{GL}$ are respectively set as 34.5 μs, 16.6 ms (60 Hz), 22 V, and 0 V. A voltage which is applied to the scan electrode 102 in the preceding line (counter voltage) has a wave form wherein the phase is shifted by one scanning period ahead from the scan voltage $V_G$. In this case, almost all of the period is at the non-selective voltage level.

Since the maximum voltage which was applied to the liquid crystal was 5.5 V, the signal voltage $V_D$ was applied in a range of ±5.5 V to a center voltage $V_{D-C}$ depending on display gradation. The center voltage $V_{D-C}$ of the signal voltage $V_D$ was set higher than the non-selective voltage $V_{GL}$ of the scan voltage on account of a fluctuation amount ΔVs of the pixel voltage $V_S$, which would be generated when the thin film transistor was switched from the on-condition to the off-condition, so that the liquid crystal driving voltage $V_{LC}$ (a voltage between the pixel electrode 104 and the scan electrode 102 in the preceding line (the counter electrode 105):=$V_S$-$V_G$') would become substantially (effectively) symmetrical in positive and negative potentials. As the result of observation of the pixel voltage, the center voltage $V_{D-C}$ was set as 2 V. Since the minimum voltage $V_{SL}$ of the pixel voltage is –5.5 V, the gate voltage $V_{GS}$ to the source voltage of the thin film transistor becomes 5.5 V, and the drain current $I_D$ is 7×10$^{-14}$ A, the pixel voltage can be retained sufficiently. Since the charge voltage $V_{DH}$ of positive polarity of the pixel voltage is 7.5 V, and the selective voltage $V_{GH}$ of the scan voltage is 22 V, the gate voltage $V_{GS}$ to the source voltage becomes 14.5 V. Consequently, the charging operation can be performed sufficiently because the thin film transistors turn to the on-condition when the drain current $I_D$ is 4×10$^{-7}$ A. The ratio of the on-current/off-current has approximately seven orders, and accordingly, the thin film transistor can be regarded as performing a switching operation sufficiently under the above described condition.

In accordance with the present invention, the display mode having features such as wide viewing-angles and low loading, wherein an electric field parallel to the substrate is applied to operate the liquid crystal, can be improved significantly, because a voltage is applied to the counter electrode through the scan electrode, and accordingly, providing wiring to supply a voltage to the counter electrode becomes unnecessary, and the region for the wiring can be utilized as a part of the aperture to increase the aperture ratio remarkably. Further, as the amount of wiring decreases significantly and the number of cross points in the wiring decreases to approximately ½ in comparison with a case when the wiring for the counter electrode is formed, the production yield can be improved remarkably.

Especially, In accordance with the present invention, the liquid crystal can be driven by an alternating current because a voltage of negative polarity, using the non-selective voltage level of the scan voltage as a standard, can be charged and retained by making $V_{TH}$=9.3 V for exceeding the value, $|V_{ON}|+V_M$=9.1 V. Accordingly, deterioration of the liquid crystal can be suppressed, and the life of the liquid crystal can be extended. Further, a residual charge accumulated in the passivation film and other elements can be decreased, and accordingly, an image display having a preferable quality without generating the residual image phenomenon can be realized.

Further, as an advantageous point, in accordance with the present invention, the same electric field as the one applied to the region between the pixel electrode 104 and the counter electrode 105 is applied to the region between the scan electrode 102 and the pixel electrode 104. This is because the scan voltage and the counter voltage are made to coincide with each other during most of the period (non-selective period) by using the non-selective voltage level of the scan voltage as the counter voltage. Therefore, the orientation failure domain caused by applying an unnecessary electric field to the region between the scan electrode 102 and the pixel electrode 104 can be eliminated, and the effective aperture region can be extended. Accordingly, covering the orientation failure domain by the shielding film 202 becomes unnecessary, and as the result, the boundary of the shielding film can be extended widely, and the aperture ratio can be improved.

Figure 10:
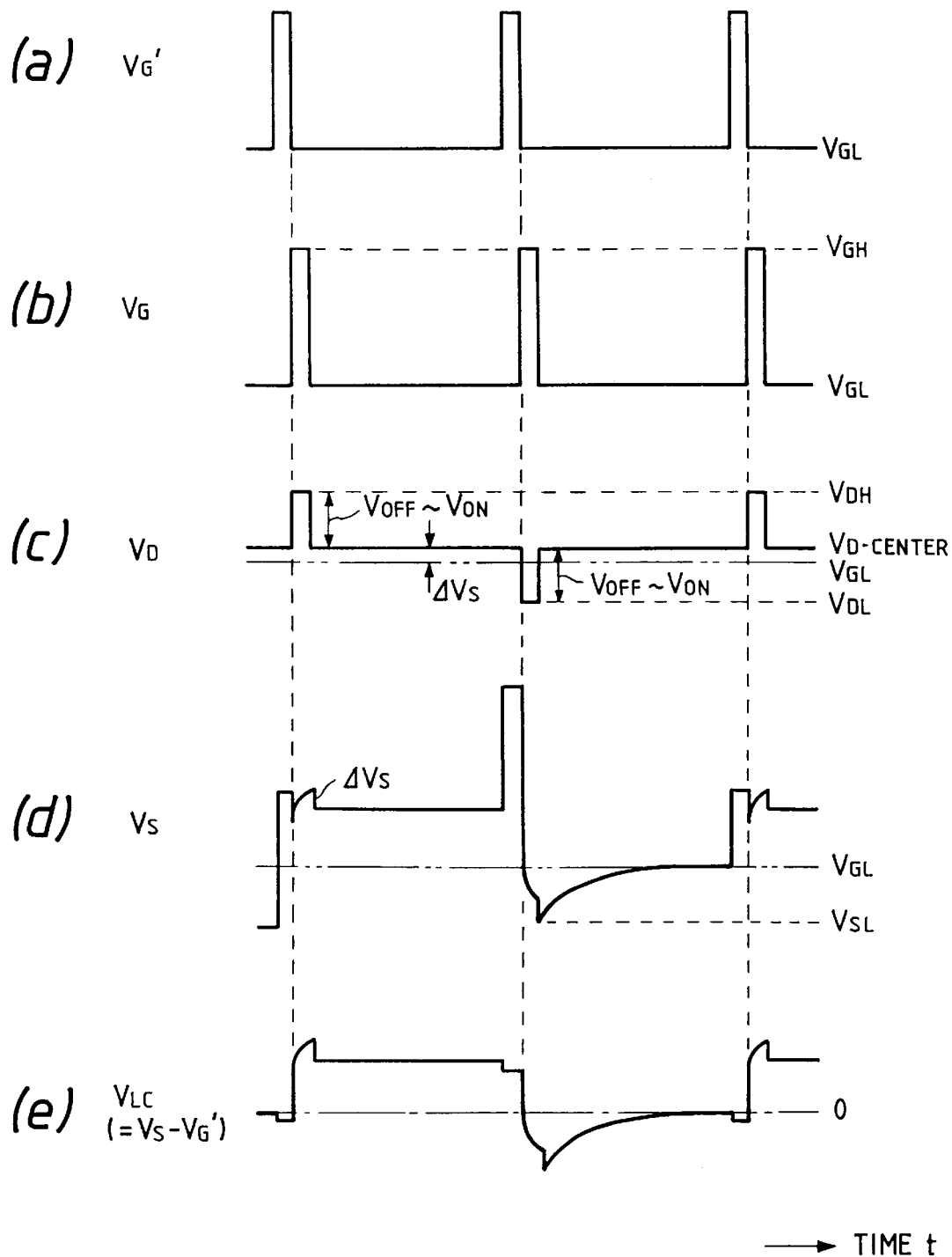
FIG. 10 is a diagram indicating waveforms of the driving voltage in a comparable example.

To provide a comparative example, a thin film transistor having characteristics as shown by the curve 502 in FIG. 6 was driven by the composition of the present invention. The gate threshold voltage $V_{TH}$ was 2.2 V. As a result, the pixel electrode voltage $V_S$ (the source voltage) became as shown in FIG. 10(d). As the gate threshold voltage $V_{TH}$ was lower than $|V_{ON}|$, when a voltage of negative polarity, taken at the non-selective voltage level of the scan voltage as a standard, was applied to the liquid crystal, the voltage could not be retained because the thin film transistor element is in a conductive condition at this time, and the voltage applied to the liquid crystal leaked. Therefore, a direct voltage was applied to the liquid crystal, causing a large amount of residual images to be generated, and the lied crystal was deteriorated in a short time.

In the above-described embodiment, the counter electrode was connected to the scan electrode in the preceding line. However, the scan electrode in the succeeding line also can be used. In the present embodiment, a liquid crystal having a positive dielectric anisotropy ΔC was used. However, a liquid crystal having a negative dielectric anisotropy can also be used. In the present embodiment, the thin film transistor was provided with an inverse staggered structure, but the cross sectional structure of the thin film transistor can also be provided with either a staggered structure or coplaner structure, and there is no special restriction.

Figure 11:
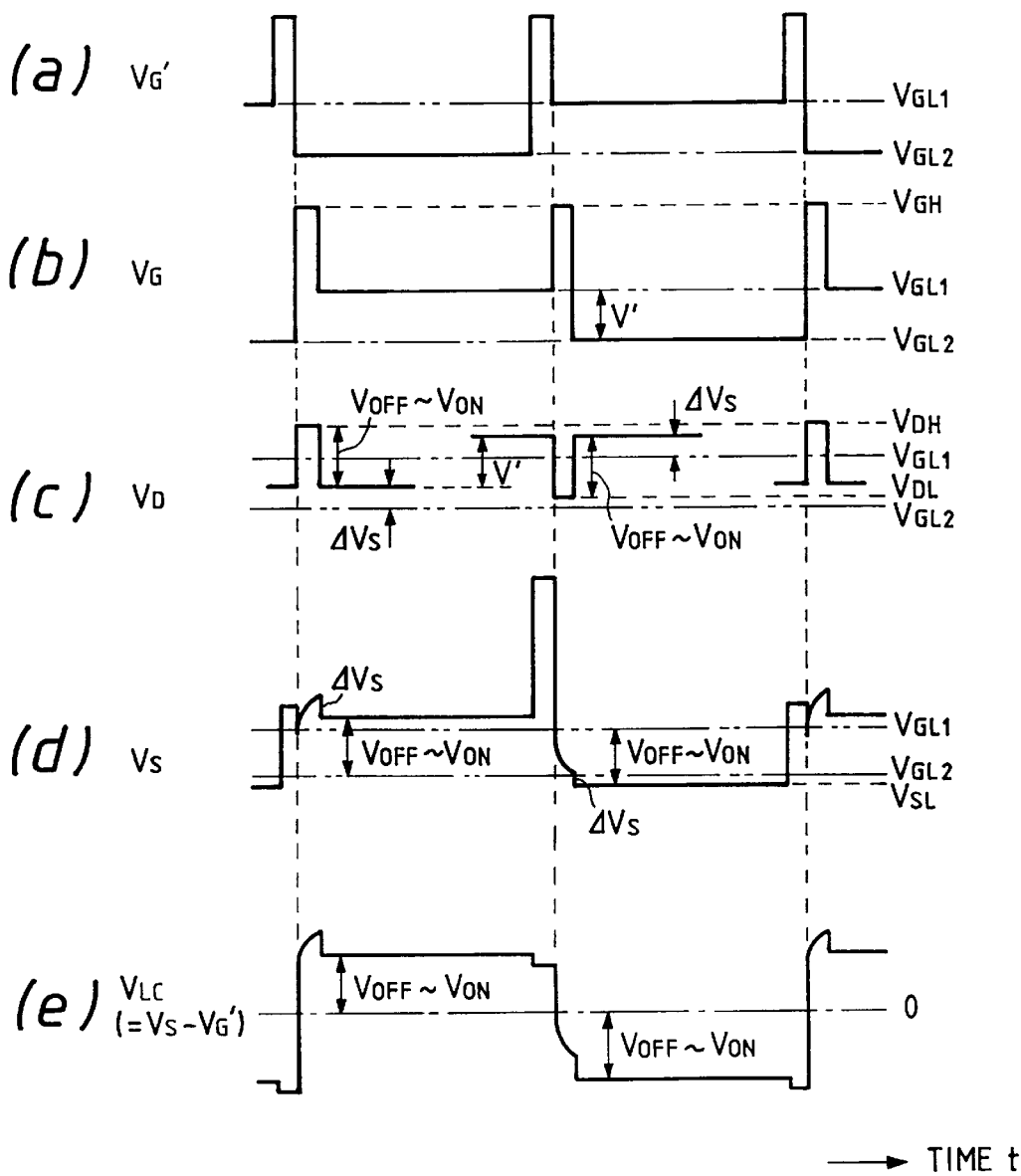
FIG. 11 is a diagram indicating waveforms of the driving voltage in the present invention.

The present invention may also employ a different driving method then that previously described, as shown in FIG. 11. The scan voltage $V_G$' of the scan electrode in the preceding line is shown in FIG. 11(a). The scan voltage $V_G$ of the scan electrode in the current line is shown in FIG. 11(b). And, the signal voltage $V_D$, the pixel voltage $V_S$, and the voltage wave form applied to the liquid crystal layer are respectively shown in FIGS. 11(c), 11(d), and 11(e). In accordance with the present invention, two levels of voltage $V_{GL1}$, $V_{GL2}$ were used for the non-selective voltage level of the scan voltage, which levels are varied alternately at every frame, as shown in FIG. 11(b), and different voltage waveforms at every line were used. The difference between the two levels of the non-selective voltage ($V_{GL1}$-$V_{GL2}$) was set to be equal to a value, ($V_{ON}$+$V_{OFF}$)/2, and the pixel voltage was set within a range of ($V_{ON}$-$V_{OFF}$)/2 taken with respect to the non-selective voltage level as a center. Accordingly, the maximum voltage of negative polarity of the gate voltage $V_{GS}$ during the non-selective period became –($V_{ON}$-$V_{OFF}$)/2. Therefore, if the gate threshold voltage $V_{TH}$ is made to exceed the value, the maximum voltage of negative ($|V_{ON}|-|V_{OFF}|$)/2-$V_M$, the maximum voltage of negative polarity (-$V_{ON}$) can be retained at the pixel electrode. If the inverse of the subthreshold slope s and the margin voltage $V_M$ are the same values as previously described (s=0.9, $V_M$=3.6 V), a gate threshold $V_{TH}$ larger than 4.1 V is usable. Therefore, the condition could be further moderated by 5.0 V as compared to the condition ($V_{TH}$>9.1 V) of FIG. 9.

Accordingly, the forming condition of the thin film transistor was moderated, and a thin film transistor which satisfied the above condition became easily obtainable. Further, the maximum amplitude $V_{DH}$-$V_{DL}$ could be decreased from 2 $V_{ON}$=11 V to (3 $V_{ON}$-$V_{OFF}$)/2=7.0 V, the circuit scale of LSI (signal driver) for driving the signal electrode could be reduced, and the power consumption could be decreased to approximately 40% as compared to the driving method of FIG. 9. As the polarity applied to the liquid crystal naturally invert at every line, flickering caused by generation of direct current component was cancelled at every line, and accordingly, the image quality could be improved.

In the example of FIG. 1, a method for making the semiconductor layer thin was used as a method for increasing the gate threshold voltage of the thin film transistor. However, in accordance with the previously described method, the gate threshold voltage depends strongly on the film thickness of the semiconductor layer and the manufacturing condition of the semiconductor layer. Therefore, a delicate variation of the film thickness of the semiconductor layer varies the gate threshold voltage significantly and causes the gate threshold voltage of every thin film transistor to fluctuate. Accordingly, the present invention aims at providing various new thin film transistors which are capable of decreasing the fluctuation of the gate threshold voltages in addition to realizing control of the threshold value.

For this objective, in accordance with the present invention, the gate threshold voltage of the thin film transistor is controlled by the back electrode which controls the back channel potential of the amorphous silicon layer.

Figure 12:
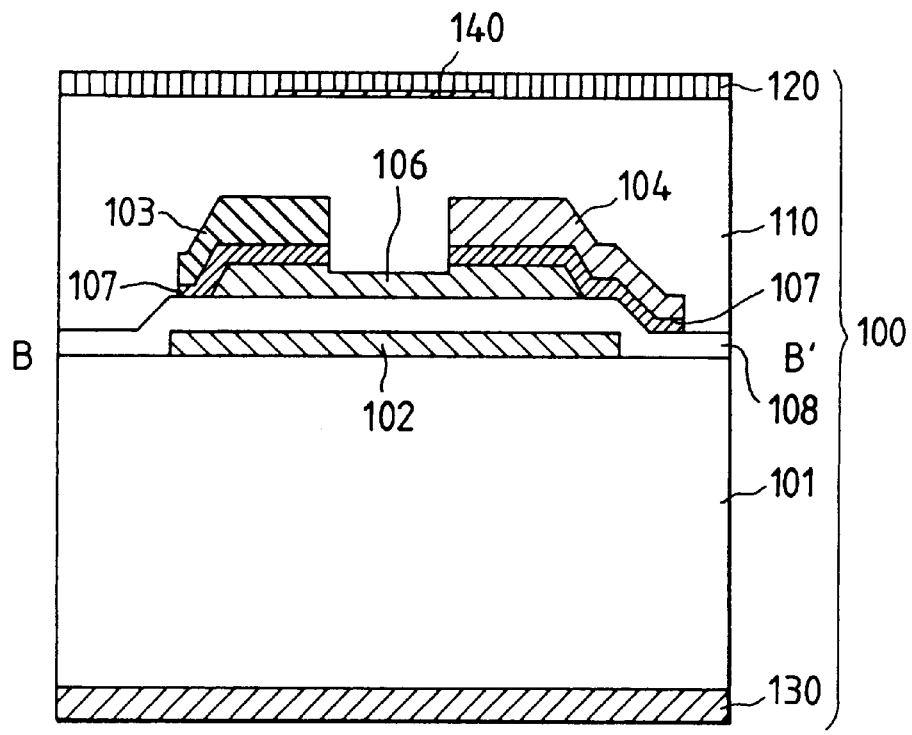
FIG. 12 is a schematic cross sectional view indicating the cross sectional structure of a thin film transistor element in accordance with this invention.
Figure 13:
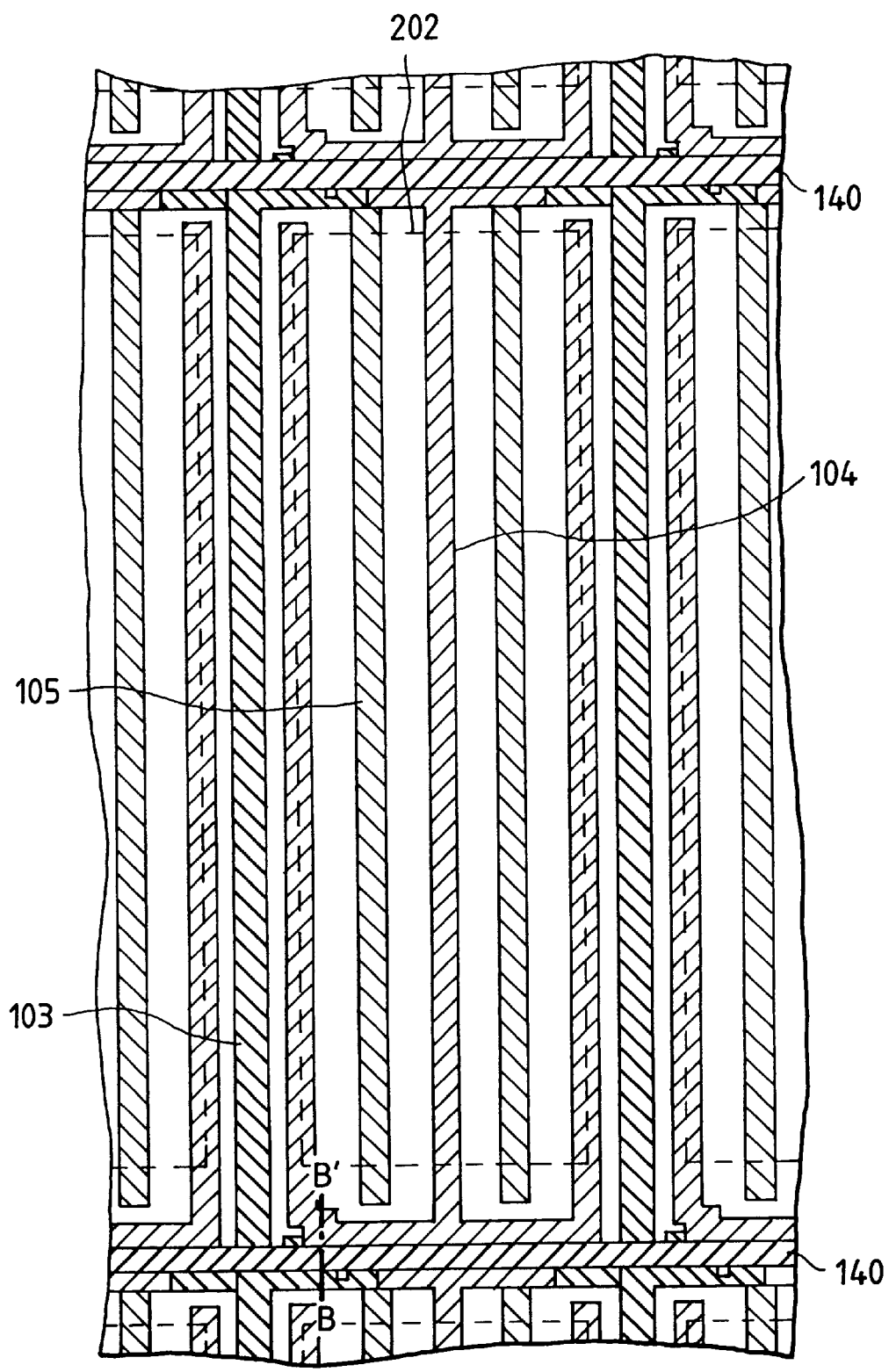
FIG. 13 is a partial plane view indicating a plane composition of the back plane electrode in FIG. 12.
Figure 14:
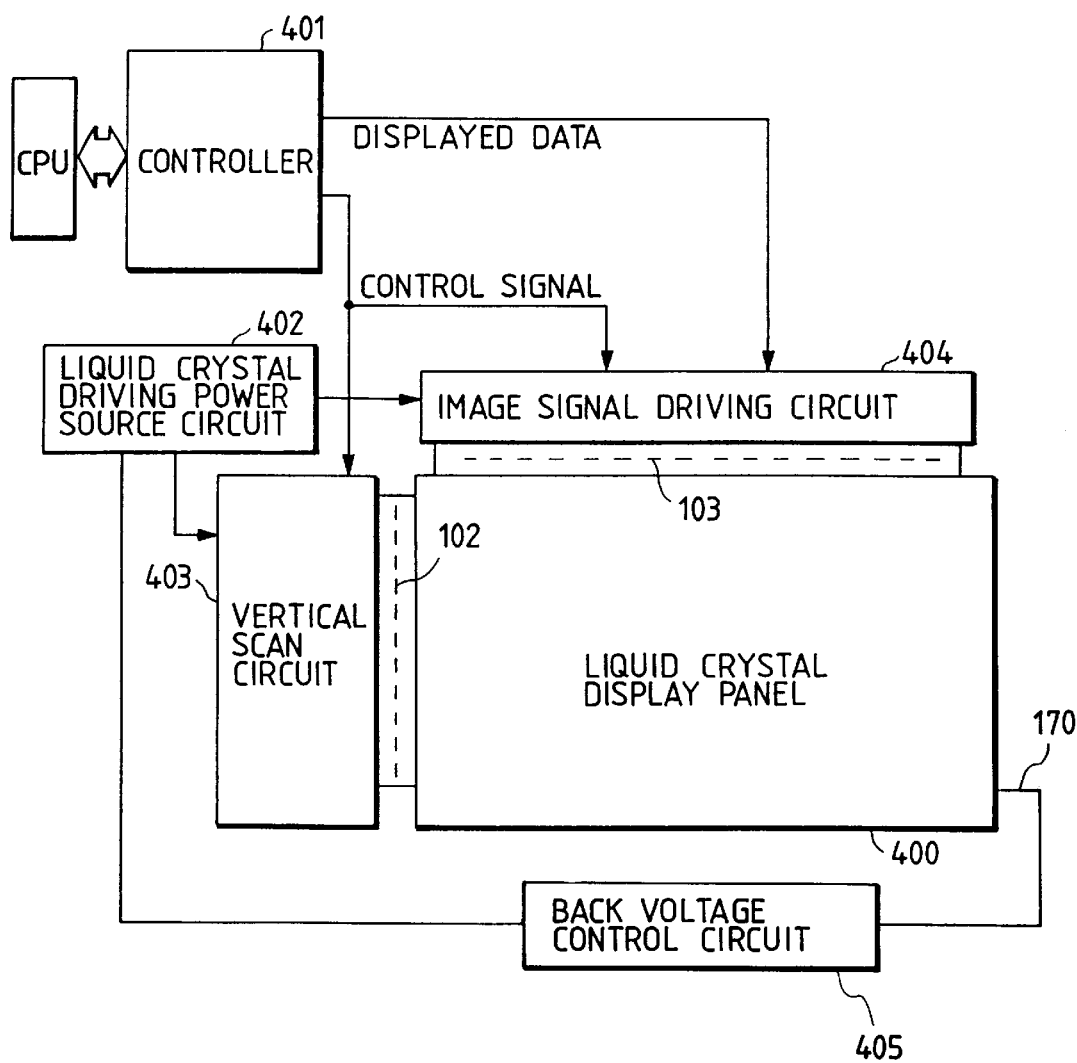
FIG. 14 is a block diagram indicating a system composition of the liquid crystal display apparatus in FIG. 12.

The schematic cross sectional structure of a thin film transistor having this feature is shown in FIG. 12. A feature of this transistor is that the back electrode 140 is provided between the passivation film 110 and the orientation film 120, and chromium was used as the material for the back electrode 140. The back electrode 140 was formed on the scan electrode as shown in FIG. 13, and was connected to a back voltage control circuit 405 as shown in FIG. 14.

Figure 15:
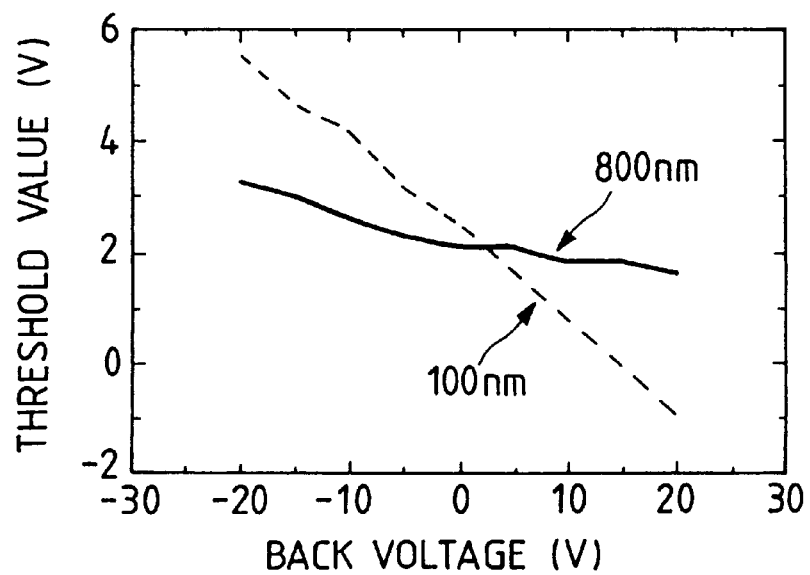
FIG. 15 is a graph indicating a relationship between the back plane voltage and the threshold voltage of the thin film transistor in FIG. 12.

Variation of the gate threshold voltage by the back voltage of the thin film transistor is shown in FIG. 15. The numerals in the figure indicate film thickness of the amorphous silicon layer 106, and the film thickness of 800 nm was used. As FIG. 15 reveals, the gate threshold voltage of the thin film transistor can be controlled by regulating the voltage of the back electrode.

If the driving method of the present embodiment is similar with that of FIG. 11, the gate threshold voltage $V_{TH}$ will be larger than 4.1 V. Accordingly, -30 V was used as the back voltage. Further, as the gate threshold voltage $V_{TH}$ could be controlled by the back voltage, deviation of the gate threshold voltage could be decreased to less than that of the example of FIGS. 1–9.

As explained above, in accordance with the present invention, by providing the back electrode for controlling the gate threshold voltage of the thin film transistor, deviation of the gate threshold voltage can be decreased in addition to the advantages of the previously described arrangements.

Figure 16:
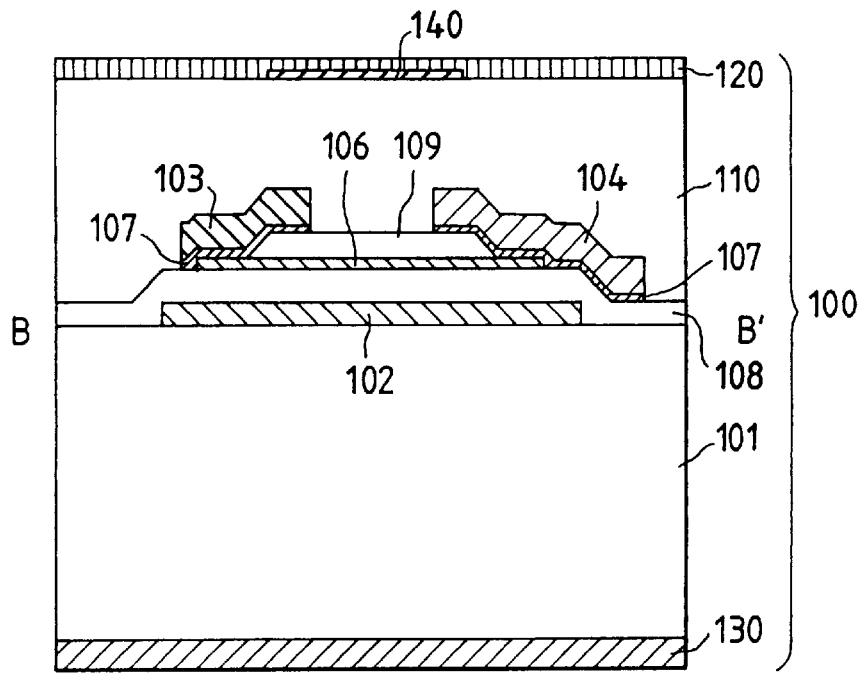
FIG. 16 is a schematic cross sectional view indicating the cross sectional structure of a thin film transistor element in accordance with this invention.

A schematic cross sectional structure of another thin film transistor is shown in FIG. 16. In accordance with this example of the present invention, the film thickness of the semiconductor layer is set to 100 nm. In order to make the semiconductor layer thin, an etching stopper is provided for preventing breakage of the channels in the channel etching process.

Variation of the gate threshold voltage by the back voltage, when a semiconductor 106 of 100 nm thickness is used, is shown in FIG. 15. The back voltage for obtaining an identical threshold value decreased from -30 V to -10 V in comparison with the case of the example of FIG. 12, when the film thickness was 800 nm as shown in FIG. 15. Accordingly, the power consumption of the back voltage control circuit 405 could be decreased.

As explained above, the power consumption could be decreased by lowering the generation voltage of the back voltage control circuit in addition to the advantages previously described.

Figure 17:
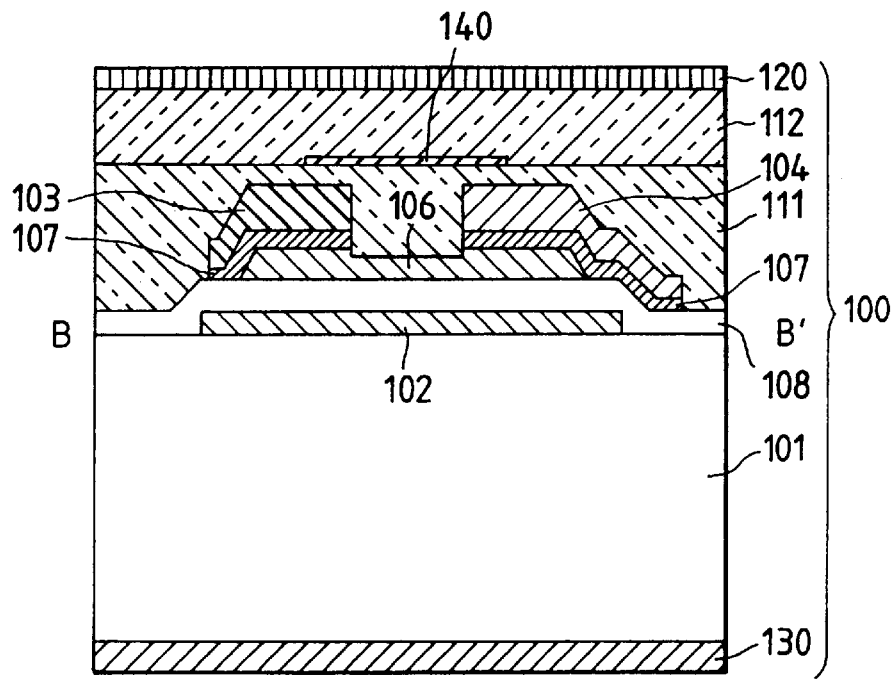
FIG. 17 is a schematic cross sectional view indicating a cross sectional structure of the thin film transistor element in FIG. 16.

The schematic cross sectional structure of another thin film transistor is shown in FIG. 17. In accordance with this example of the present invention, the passivation film has a double layer structure, and the back electrode 140 is formed between the first layer of the passivation film 111 and the second layer of the passivation film 112.

The thickness of the first layer of the passivation film 111 is approximately 300 nm so as to make the gate threshold voltage of the thin film transistor more sensitive to the back voltage by shortening the distance between the semiconductor layer 106 and the back electrode 140. Accordingly, the back voltage could be reduced further, and the power consumption could be decreased.

As explained above, power consumption could be decreased by lowering the generation voltage of the back voltage control circuit in addition to the advantages previously described.

Figure 18:
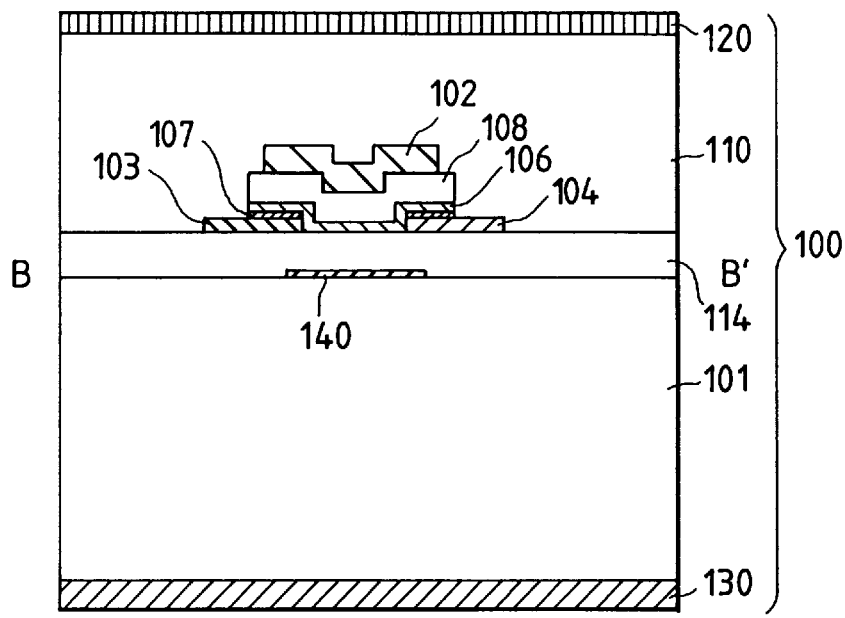
FIG. 18 is a schematic cross sectional view indicating the cross sectional structure of a thin film transistor element in accordance with this invention.

The schematic cross sectional structure of a further example of a thin film transistor is shown in FIG. 18. In accordance with this example of the present invention, the back electrode 140 is formed between the glass substrate 101 and the insulating film 114 which is formed on the glass substrate.

By adopting the staggered structure of the thin film transistor, the semiconductor layer 106 could be made thin without using an etching stopper. And, the influence of the electric field due to the back voltage on the liquid crystal layer could be decreased by forming the back electrode as the lower most layer. Accordingly, orientation failure of the liquid crystal by the back voltage could be decreased.

As explained above, in accordance with the present invention, orientation failure of the liquid crystal by the back voltage can be decreased in addition to the advantages previously described.

Figure 19:
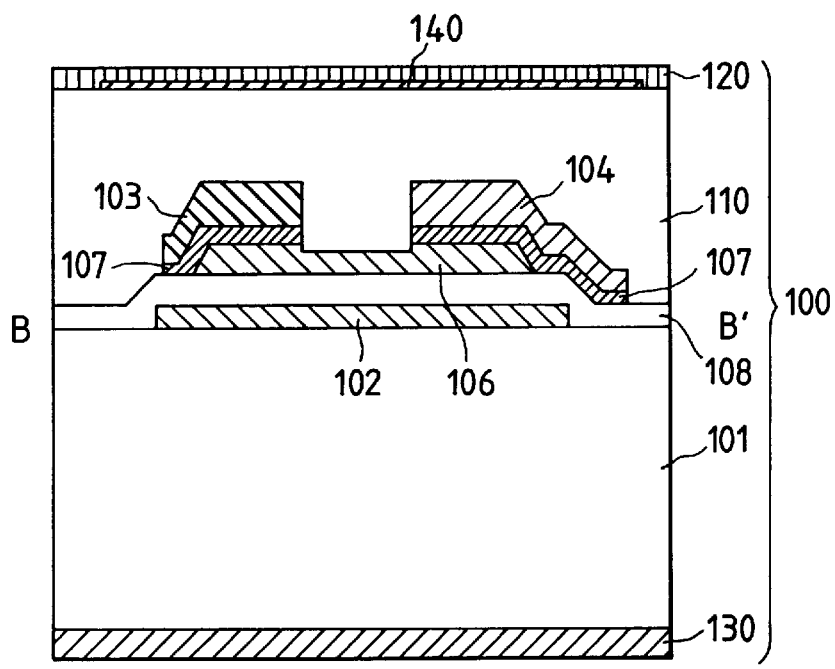
FIG. 19 is a schematic cross sectional view indicating the cross sectional structure of a thin film transistor element in accordance with this invention.
Figure 20:
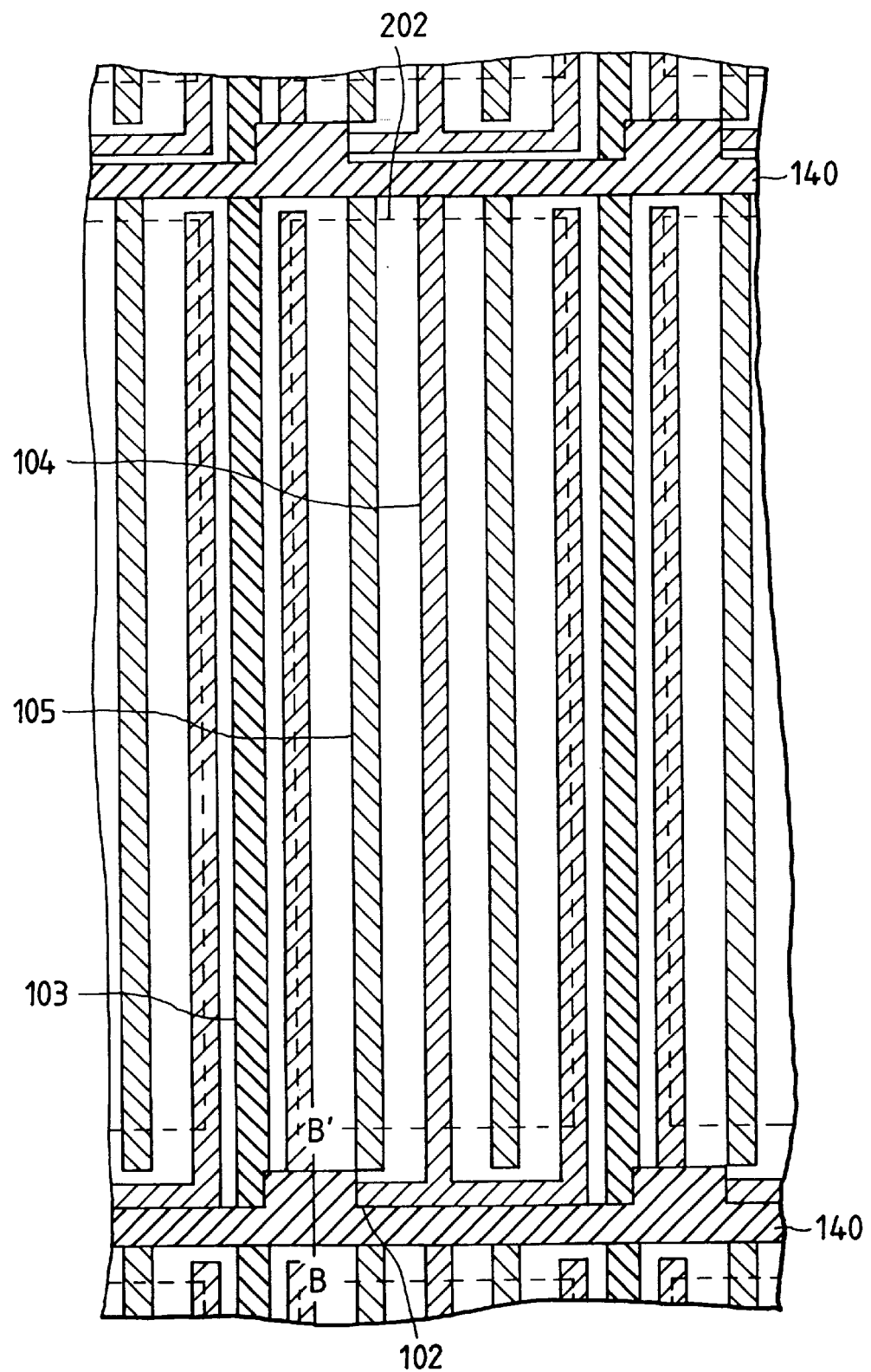
FIG. 20 is a partial plane view indicating the composition of the back plane electrode in FIG. 19.

The schematic cross sectional structure of another example of a thin film transistor in accordance with the present invention is shown in FIG. 19. A partial schematic plan view is shown in FIG. 20. In order to prevent characteristics of the thin film transistor from fluctuating due to optical current, at least a region of amorphous silicon film at a channel portion of the thin film transistor must be shielded. In order to make the shielding certain, shielding of all of the region of the amorphous silicon film of the thin film transistor portion is desirable. However, the pigment BM used in the example of FIG. 1 was insufficient in regard to the shielding rate for suppressing optical current of the TFT. Therefore, in the present invention, the back electrode 140 was used for shielding the thin film transistor in addition to the shielding film 202 made of the pigment used in the example of FIG. 1. In this case, the back electrode 140 must have a shielding ability which is equivalent to metal. In the present embodiment, fluctuation of the characteristics of the TFT caused by optical current could be decreased by increasing the shielding rate of the TFT portion by using the back electrode 140 concurrently as the shielding film.

As explained above, in accordance with the present invention, fluctuation of the characteristics of the TFT can be decreased in addition to the advantages previously described.

In a further example of a thin film transistor, the gate threshold voltage of the TFT is controlled by controlling the potential of the back electrode by avalanche injection.

In accordance with this feature, the scan electrode 102 is connected to earth and a large negative voltage is applied to the signal electrode 103. The value of electric field applied to the insulating film between the signal electrode 103 and the back electrode 140 was increased to the value which could cause the avalanche injection of electrons, and electrons were injected into the back electrode 140 by avalanche injection. As a result, the back electrode was charged with negative potential, and the gate threshold voltage of the thin film transistor was shifted to the positive direction corresponding to the amount of electrons injected per unit area. Accordingly, the gate threshold voltage of this thin film transistor can be controlled by controlling the amount of injected electrons, or positive holes. Further, whether avalanche injection is caused or not depends not on the potential between the electrodes, but on the strength of the electric field applied to the insulator dividing the electrodes. Accordingly, the film thickness of the insulator between the signal electrode 103 and the back electrode 140 is desired to be sufficiently thin within a range for ensuring the insulating ability. Further, injection of electrons or positive holes into the gate insulator can be prevented, and injection of a necessary amount of electrons or positive holes into the back electrode becomes possible, by setting the potential between the signal electrode and the scan electrode adequately. As the electric field applied to the insulator during operation of the display panel is small in comparison with the electric field applied to the insulator at the time of injection, the electrons or the positive holes injected once are stable for a long period.

By using the thin film transistor of this example, it becomes unnecessary to connect the back electrode to an external circuit, and the back voltage control circuit can be omitted.

As explained above, in accordance with the present invention, the back voltage control circuit can be omitted, and the scale of the external circuit can be decreased in addition to the advantages afforded by the previously described examples.

In the examples of FIGS. 12 and 16–18, the back electrode wiring may be formed on the scan electrode wiring with an insulator disposed therebetween, or on the signal electrode with an insulator disposed therebetween. Otherwise, the back electrode wiring may be formed on both the scan electrode and the signal electrode with an insulator disposed therebetween, or may be formed on a quite separated location apart from either or both of the scan electrode wiring and the signal electrode wiring. In case of the staggered type transistor element, the relative order of forming respective electrodes on the substrate is inverse to the case of the inverse staggered type, and the relationship of the relative position of the respective electrode wiring and the back electrode wiring with the insulator disposed therebetween becomes opposite to the inverse staggered type. However, all of the above cases are included in the described examples. In case of a planer type transistor element, a relationship of the relative position of the back electrode wiring and the respective electrode wiring is similar with either of the above described staggered type or inverse staggered type, and the case is included in the described embodiments.

Figure 21:
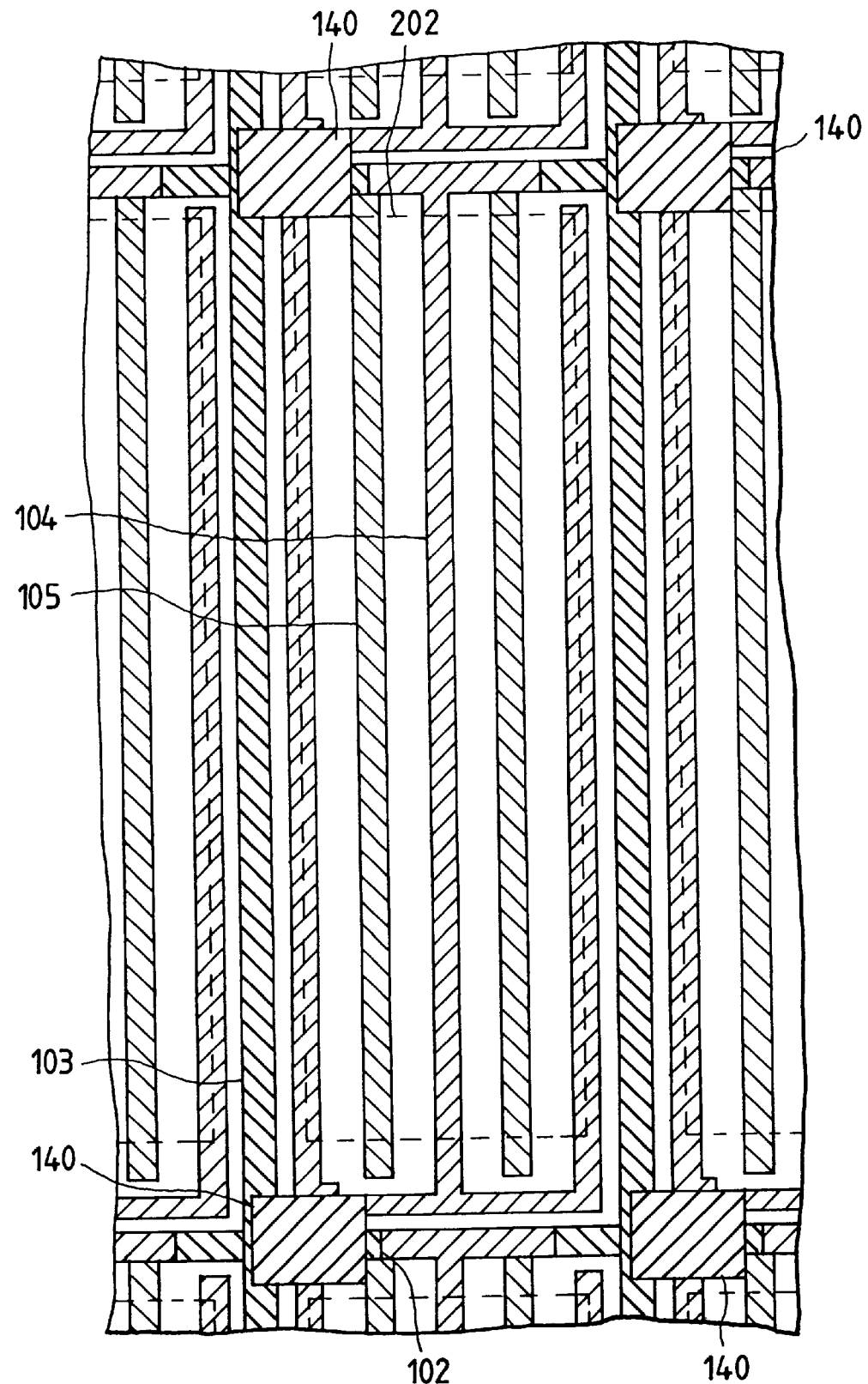
FIG. 21 is a partial plane view indicating the plane composition of a back plane electrode in accordance with this invention.

In accordance with another feature of the present invention, respective back electrodes 140 may be made independent, as shown in FIG. 21. With such an arrangement, crossing areas of the back electrode 140 and the scan electrode 102, or the signal electrode 103, are decreased, probabilities of a short circuit between the back electrode 140 and the scan electrode 102, and between the back electrode 140 and the signal electrode 103, are decreased, and accordingly, the possibility of a fraction defect decreases. Even if a short circuit accident happens, its effect is restricted within the thin film transistor which has caused the accident, propagation of the effect to the whole of the display panel can be prevented, and accordingly, the fraction defective can be further decreased.

As explained above, in accordance with the present invention, a liquid crystal display panel having a preferable production yield can be obtained in addition to the advantages previously described.

Although amorphous silicon is used for the semiconductor layer 106 in the above-described examples, the kind of semiconductor layer used is not especially restricted in this way. Further, the scan electrode, the signal electrode, the pixel electrode, the back electrode, and the counter electrode may be made either of Cr, or a double layer film of Cr/Al, but other metals, alloys, semiconductors, and transparent electrodes can be used, and their kinds are not restricted. However, when the back electrode operates concurrently as the shielding film, the material used for the back electrode must have a sufficient shielding property.

The gate threshold voltage of the thin film transistor can be approximately expressed by the following equation:

$$V_t = \phi_{m-s} - Qf/C_{OX} + 2\times\phi_f - Q_b/C_{OX} \qquad \text{(Equation 1)}$$

where,
$V_t$: Threshold voltage
$\phi_{m-s}$: Difference of working function between metal and semiconductor with an insulator held between
$Q_f$: Density of charge at the gate insulator
$\phi_f$: Bend of energy bands by electric field
$Q_b$: Density of charge at the semiconductor layer
$C_{OX}$: Capacitance of the gate insulator As shown in the equation 1, the gate threshold voltage of the thin film transistor can be controlled by controlling the amount of positive and negative charge in the semiconductor layer. The factor $Q_b$ in the equation 1 is proportional to $-qN_a$ or $qN_d$, where q is the electric charge of an electron, $N_a$ is the density of an acceptor in the semiconductor layer, and $N_d$ is density of a donor in the semiconductor layer. Accordingly, the gate threshold voltage can be controlled by controlling the amount of acceptors or donors in the semiconductor layer.

For this purpose, boron (B) was doped into the amorphous silicon of the semiconductor layer 106. The gate threshold voltage of the thin film transistor could be controlled by introducing acceptors into the semiconductor layer 106.

Variation of the gate threshold voltage depending on the amount of boron doped into the thin film transistor is shown in FIG. 22. In the accordance with present invention, a gate threshold voltage $V_{TH}$ larger than 4,1 V, as required in the driving method of FIG. 11, was satisfied by doping boron of 100 ppm.

In the control of the gate threshold voltage in accordance with the present feature, forming the back electrode such as required by the feature of FIG. 12 is not necessary, and accordingly, the fabrication process is simplified and productivity is improved. Fluctuation of the gate threshold voltage can be decreased because the gate threshold voltage becomes insensitive to the amount of doped boron when the boron is doped more than 2 ppm as shown in FIG. 22.

As explained above, by using a semiconductor wherein an acceptor is introduced for the semiconductor layer of the thin film transistor, the fluctuation of the gate threshold voltage can be reduced and improved productivity can be achieved in addition to the advantages previously described.

A schematic cross sectional structure of a thin film transistor is shown in FIG. 23. In the present example, the semiconductor layer of the thin film transistor was composed by a double layer structure comprising a doped semiconductor layer 150 and a pure semiconductor layer 151.

When acceptors are introduced into the semiconductor layer in order to increase the gate threshold voltage, conductivity by holes in a non-channel region of the semiconductor increases with increase of the amount of introduced acceptor. In the above case, the current cutting out ability of the thin film transistor decreases, that is, the off characteristics are deteriorated, and accordingly, the voltage retention ability of the liquid crystal panel is decreased.

Therefore, in the present example, the semiconductor layer was composed of a two layer structure, the one is a doped semiconductor layer 150 at the channel side and the other is a pure semiconductor layer 151 at the non-channel side. Accordingly, generation of conductivity by the holes in the non-channel region of the semiconductor could be prevented, and the off characteristics of the thin film transistor were improved.

As explained above, it is possible to prevent deterioration of the off characteristics of the thin film transistor, improve the voltage retention characteristics, and improve image quality in addition to the advantages.

In accordance with the present invention, the gate threshold voltage can be controlled and the production yield of the thin film transistor can be improved by using SiON and SiO respectively as the materials for the gate insulator 108 of the amorphous silicon thin film transistor The gate threshold voltage obtained with the respective materials for the gate insulator of the thin film transistor manufactured in accordance with the features of FIGS. 22 and 23 is shown in the following Table:

TABLE 1

| Insulator | Threshold voltage (V) |
|---|---|
| SiN | 1.1 |
| SiON ($N_2O/NH_3$ = 1/20) | 2.1 |
| SiON ($N_2O/NH_3$ = 1/1) | 2.9 |
| SiON ($N_2O/SiH4$ = 40/1) | 3.8 |

The present example, however, could not satisfy the condition required by the driving method of FIG. 11. However, if a liquid crystal which operates with a lower voltage than the driving voltage of the driving method of FIG. 11 is used, or the gap between electrodes is shortened, the required condition can be satisfied. Accordingly, the required gate threshold voltage can be satisfied by combining an appropriate semiconductor layer and an insulator. Further, the gate threshold voltage is determined by the combination of the semiconductor layer 106 and the gate insulator 108, and accordingly, fluctuation of the gate threshold voltage is small.

As explained above, fluctuation of the gate threshold voltage can be suppressed, and productivity can be improved by the present feature in addition to the advantages previously described with reference to FIG. 22.

Figure 24:
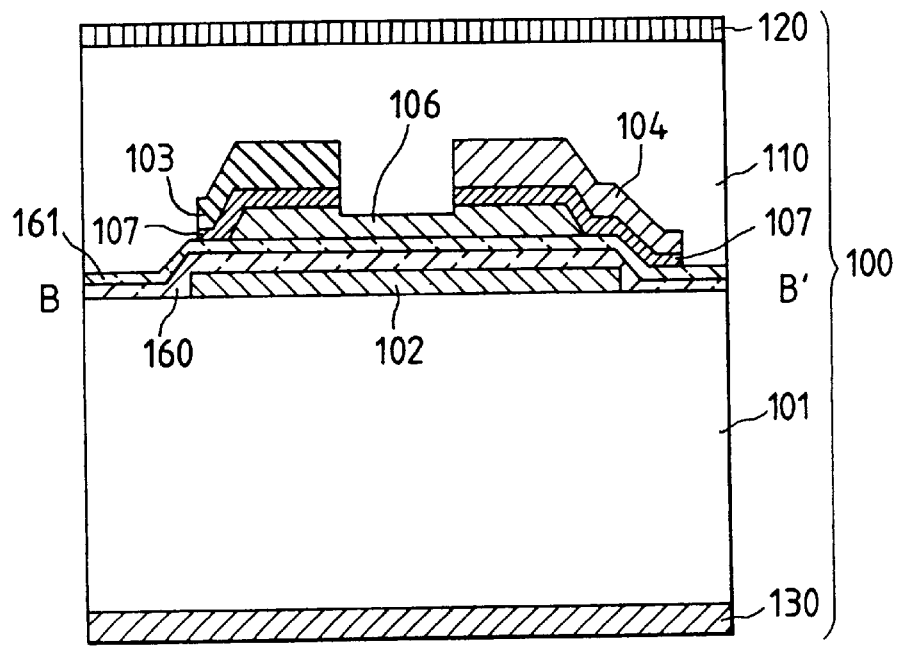
FIG. 24 is a schematic cross sectional view indicating the cross sectional structure of a thin film transistor element in accordance with this invention.

A schematic cross sectional structure of a further example of a thin film transistor in accordance with the present invention is shown in FIG. 24. The gate insulator was composed of a two layer structure, wherein SiON or SiO 160 was used for the insulator at the gate electrode side, and SiN 161 was used for the insulator at the channel side.

In the present example, contamination at the boundary of the semiconductor layer 106 and the gate insulator 161 could be prevented by forming the SiN 161 of the gate insulator at the channel side and the amorphous silicon 106 successively by a plasma CVD method, and consequently, improvement of mobility was realized.

As explained above, the present example improves mobility in addition to the advantages afforded by the features of FIGS. 22 and 23 by composing the gate insulator of a two layer structure of SiN and SiON or SiO.

Figure 25:
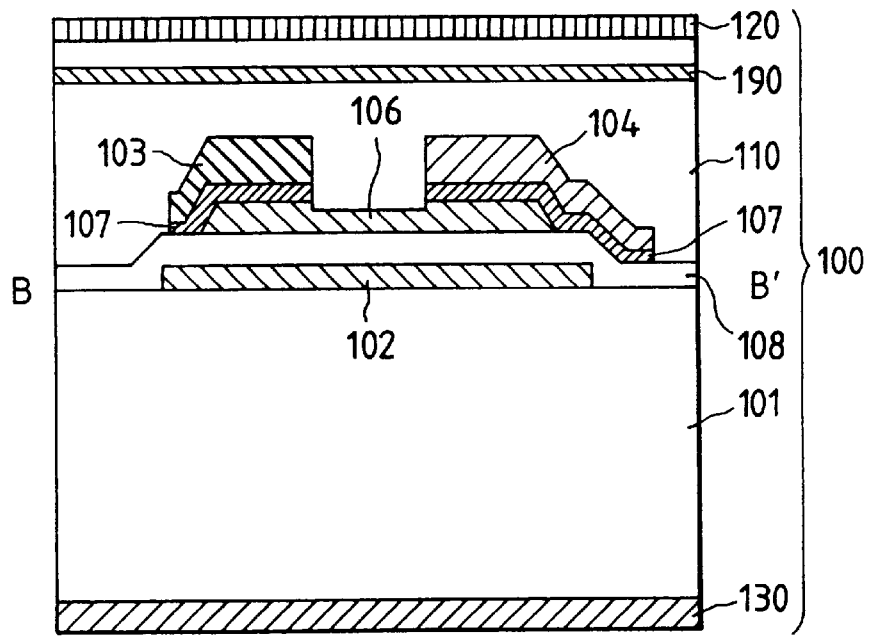
FIG. 25 is a schematic cross sectional view indicating the cross sectional structure of a thin film transistor element in accordance with this invention.

A schematic cross sectional structure of another example of a thin film transistor in accordance with the present invention is shown in FIG. 25.

In the present example, phosphorus (P) was ion implanted into the passivation film 110 and the polarity of the back potential of the semiconductor layer 106 was made negative by a negative electric charge of P so as to shift the gate threshold voltage of the thin film transistor toward the positive direction. The region 190 for the ion implantation was controlled in a range from 300 nm to 1000 nm from the semiconductor layer 106.

Similar advantages with respect to those described with reference to FIG. 12 were obtained.

Figure 26:
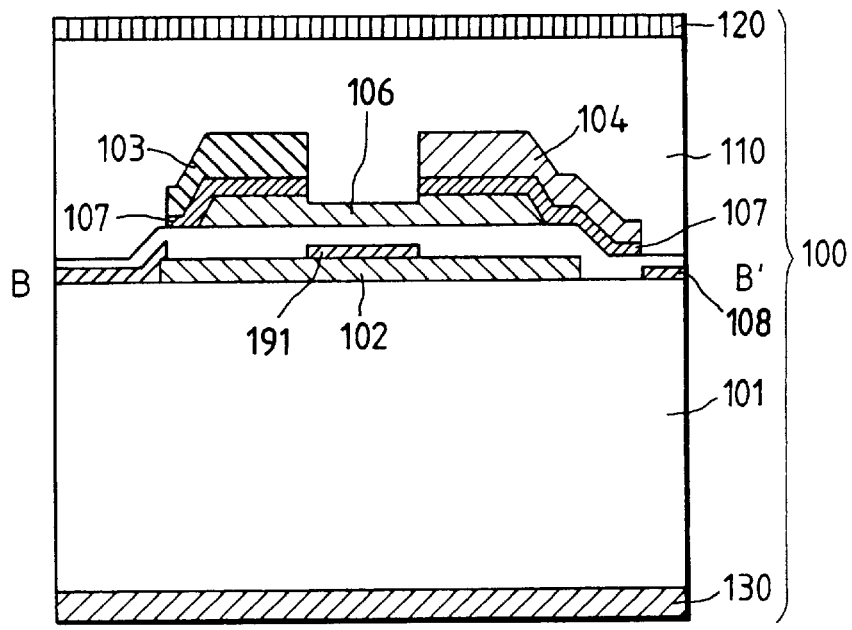
FIG. 26 is a schematic cross sectional view indicating the cross sectional structure of a thin film transistor element in accordance with this invention.

A schematic cross sectional structure of an example of a thin film transistor in accordance with the present invention is shown in FIG. 26. In the present example, B (boron) was ion implanted at the boundary of the gate insulator 108 and the scan electrode 102 so as to cancel a predetermined amount of negative electric charge which was induced when the scan electrode was charged positively in order to shift the gate threshold voltage of the thin film transistor element toward positive direction.

Similar advantages with respect to those described with reference to FIG. 12 were obtained.

Figure 27:
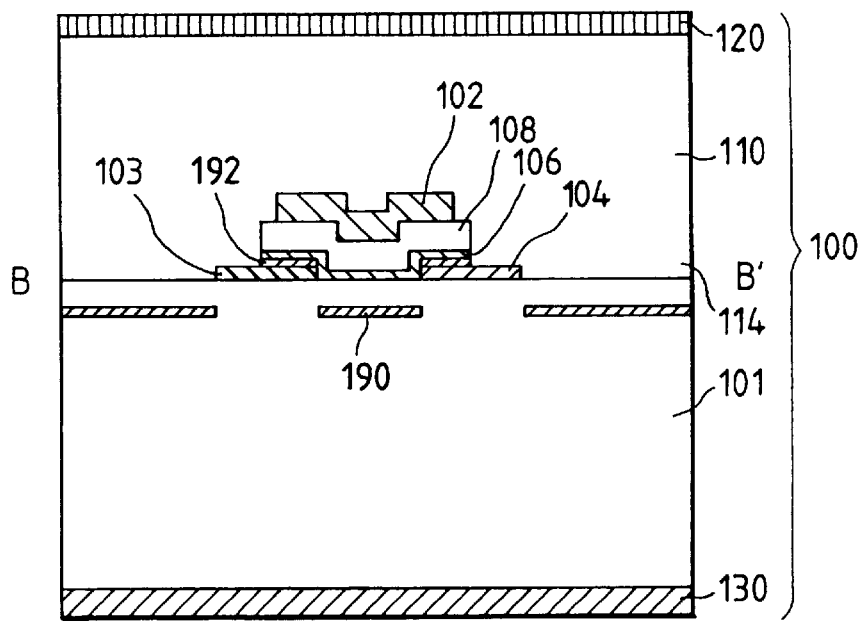
FIG. 27 is a schematic cross sectional view indicating the cross sectional structure of a thin film transistor element in accordance with this invention.

A schematic cross sectional structure of a further example of a thin film transistor in accordance with the present invention is shown in FIG. 27. In the present example, the structure of the thin film transistor element is a staggered structure, and P (phosphorus) was ion implanted into the insulating substrate 114. Accordingly, the gate threshold voltage of the thin film transistor element could be shifted toward the positive direction similar to the example of FIG. 25.

Further, in the present example, a n+amorphous silicon region 192 for ohmic contact of the signal electrode 103, the pixel electrode 104, and the semiconductor layer 106 can be formed by ion implantation. In the present example, P was ion implanted into the insulating substrate 114 before forming the scan electrode 102 and after forming the gate insulator. At that time, as the signal electrode 103 and the pixel electrode 104 were made of metal, the portions of the above electrodes were blocked against P, and a region where P was implanted was formed at the boundary region of the signal electrode 103 and the pixel electrode 104 with the semiconductor layer 106. Accordingly, the amorphous silicon at the region where the P was implanted was made to n+, and ohmic contact was obtained. Therefore, a separate process for forming n+ amorphous silicon becomes unnecessary, and so the productivity can be improved. Further, an etching process for separating the n+ amorphous silicon into the signal electrode 103 and the pixel electrode 104 becomes unnecessary, and accompanying deterioration of on-characteristics can be avoided.

Similar advantages with respect to those discussed with reference to FIG. 12 can be obtained, productivity is improved, and preferable transistor characteristics can be obtained.

In accordance with the present invention, control of the gate threshold voltage can be realized by adopting a structure wherein the gate electrode (scan electrode 102) of the thin film transistor is shifted toward either of the source electrode (signal electrode 103) side or the drain electrode (pixel electrode 104) side.

In the thin film transistor, a potential between the gate (scan electrode 102) and the source (signal electrode 103) or the drain (pixel electrode 104) exceeding the gate threshold voltage and a channel region which is conductive means that sufficient electric charge for forming the channel region is induced at the boundary in contact with the gate insulator of the semiconductor layer 106. The above electric charge is induced in the semiconductor layer 106 at the boundary with the gate insulator 108 so as to cancel any space charge induced by an electric field applied to the gate insulator 108 at the boundary of the gate insulator 108. Accordingly, in order to shift the gate threshold voltage of the thin film transistor toward the positive direction, decreasing the amount of space charge induced at the boundary of the gate insulator by decreasing the value of electric field applied to the gate insulator is thought to be effective.

In a thin film transistor having a structure wherein a part of the channel region lacks the gate electrode, an intensity of electric field applied to the insulator on the part of the region which lacks the gate electrode is assumed to be smaller than the intensity of the electric field applied to the insulator on the part of the region where the gate insulator exists. The above assumption is thought to be certain based on the fact that, in a thin film transistor having a structure wherein the gate electrode is shifted completely toward either the source electrode side or the drain electrode side and the gate electrode does not exist entirely in the channel region, at least a part of the gate insulator which does not contact the gate electrode can not be applied with a sufficient electric field and does not exhibit switching characteristics. Therefore, the necessary potential between the gate electrode and the signal electrode or the pixel electrode for inducing a sufficient charge to form a channel layer in the semiconductor layer having no gate electrode is assumed to be larger than the necessary potential between the gate electrode and the signal electrode or the pixel electrode for inducing sufficient electric charge to form a channel layer in the semiconductor layer having the gate electrode.

Figure 28A:
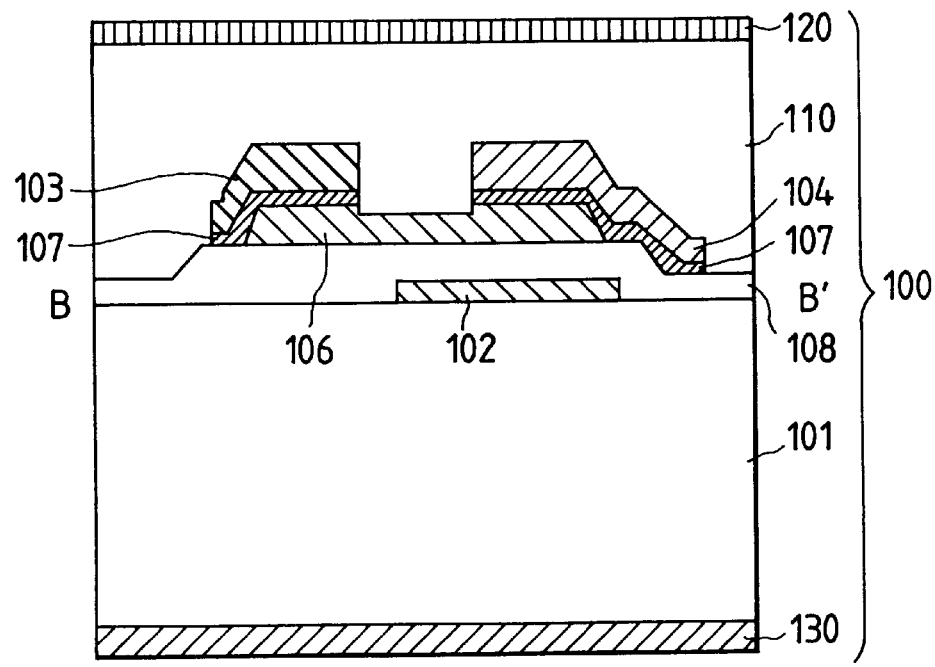
FIGS. 28(a) and (b) are schematic diagrams illustration indicating the structure of a thin film transistor element ((a): a schematic cross sectional structure, (b): a schematic plane structure)
Figure 28B:
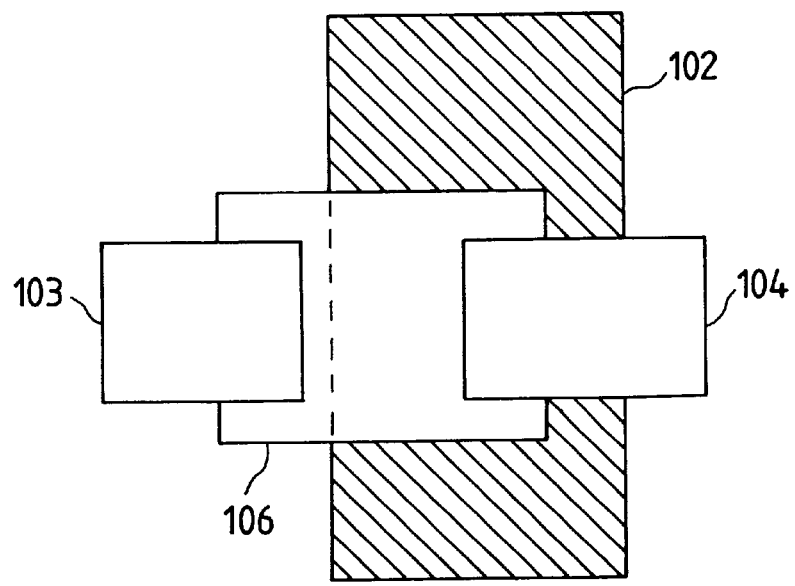

On the basis of the above considerations, a schematic cross sectional view and a schematic plan structural view of an example of a thin film transistor in accordance with the present invention are shown in FIGS. 28(*a*) and 28(*b*), respectively. A feature of the thin film transistor of the present example is in having a structure wherein the gate electrode of the thin film transistor is shifted toward either the source electrode side or the drain electrode side.

In the present example, the gate threshold voltage could be increased toward the positive direction by setting the shifted position of the gate electrode adequately without losing the switching characteristics. Further, in accordance with the present example, the gate threshold voltage can be controlled by the shape of the gate electrode. This feature means that, if a photomask is first manufactured, the addition of a process and utilization of a new gas for controlling the gate threshold voltage become unnecessary hereafter. Therefore, increasing the production cost by controlling the gate threshold voltage could be suppressed in accordance with this feature.

As explained above, in accordance with the present invention, mass-productivity of the thin film transistor can be improved in addition to the advantages discussed with reference to FIG. 12.

Figure 29A:
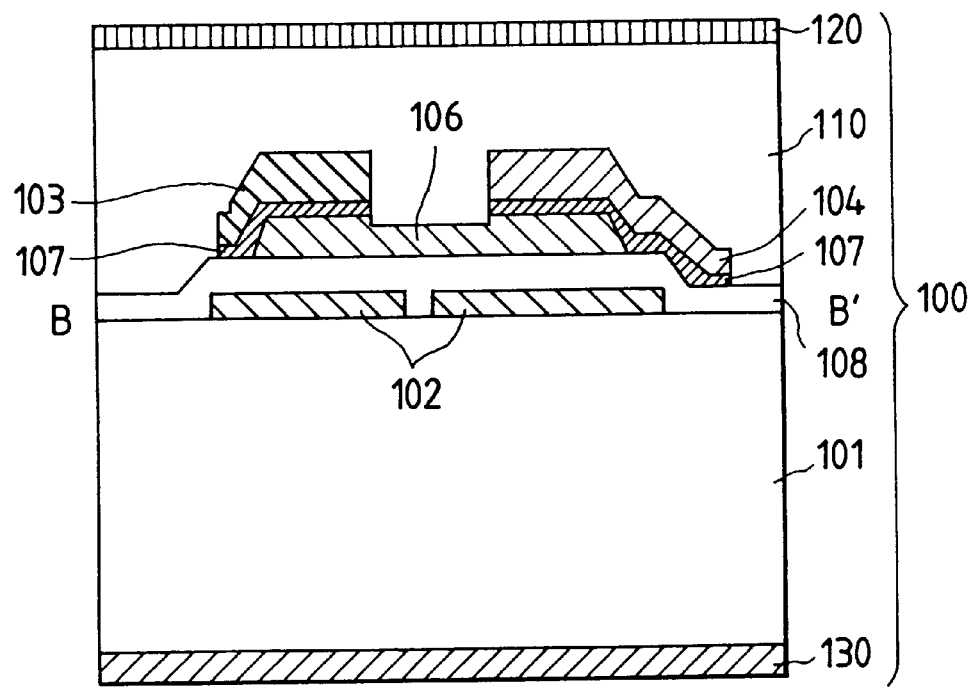
FIGS. 29(a) and (b) are schematic diagram indicating the structure of a thin film transistor element ((a): a schematic cross sectional structure, (b): a schematic plane structure)
Figure 29B:
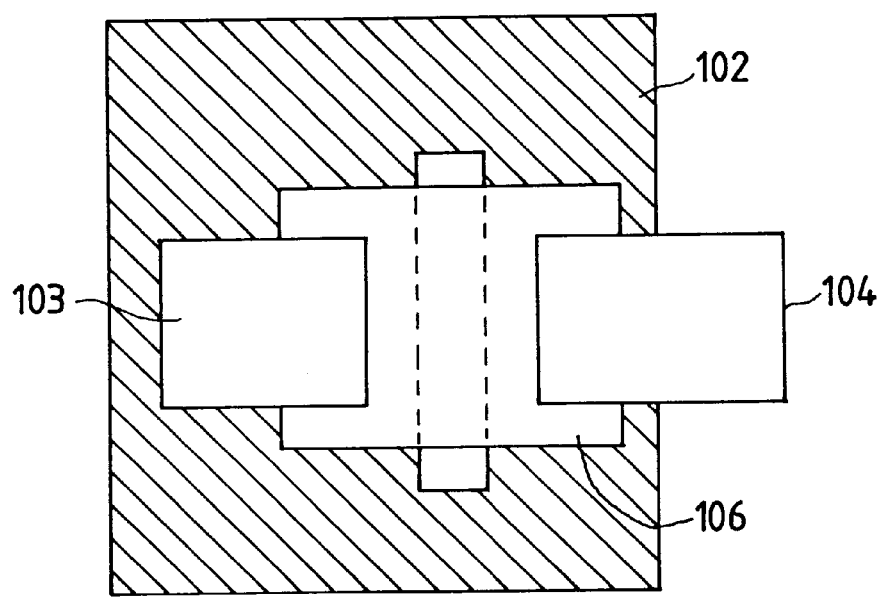

A schematic cross sectional view and a schematic plan structural view of another example of a thin film transistor in accordance with the present invention are shown in FIGS. 29(*a*) and 29(*b*), respectively. A feature of this thin film transistor is in having at least two gate electrodes in the channel region, and accordingly, having at least one portion which lacks the gate electrode within the channel region as shown in FIG. 29(*a*).

As explained with reference to FIGS. 28(*a*) and 28(*b*), in the thin film transistor having a structure wherein the gate electrode is shifted toward either the source electrode or the drain electrode, the gate threshold voltage depends significantly on a relationship of the relative positions of the gate electrode, the source electrode, and the drain electrode. This feature means that enhanced preciseness of alignment is required when manufacturing the electrodes of the thin film transistor. Accordingly, the necessary time for aligning the photomask increases, and productivity decreases. In order to avoid decreasing the productivity, a structure by which the gate threshold voltage does not depend on the relationship of the relative positions of the respective electrodes must be adopted. In accordance with the structure wherein at least two gate electrodes are existing in the channel region as shown in FIG. 29(*a*), the gate threshold voltage is determined by a gap between the gate electrodes mutually, and preciseness of the gap is determined by etching preciseness of the gate electrodes. Accordingly, the preciseness of the alignment of the respective electrodes is required only for forming the gap between the electrodes located within the channel region, and the preciseness such as the enhanced preciseness required in the example of FIGS. 28(*a*) and 28(*b*), is not required. Therefore, severe alignment as required in the previous example becomes unnecessary, and the productivity is improved.

As explained above, in accordance with the present invention, the productivity can be is further improved in addition to the advantages afforded by the example of FIG. 28(*a*).

If the number of the gate electrodes in the channel region is at least two, the structure is included in the category of the present invention regardless of its shape.

Further, controlling the gate threshold voltage in a wider range by combining features of at least two or a plurality of the above examples as compared to the range realized by use of an individual feature of the respective examples is also included in the scope of the present invention.

Figure 30:
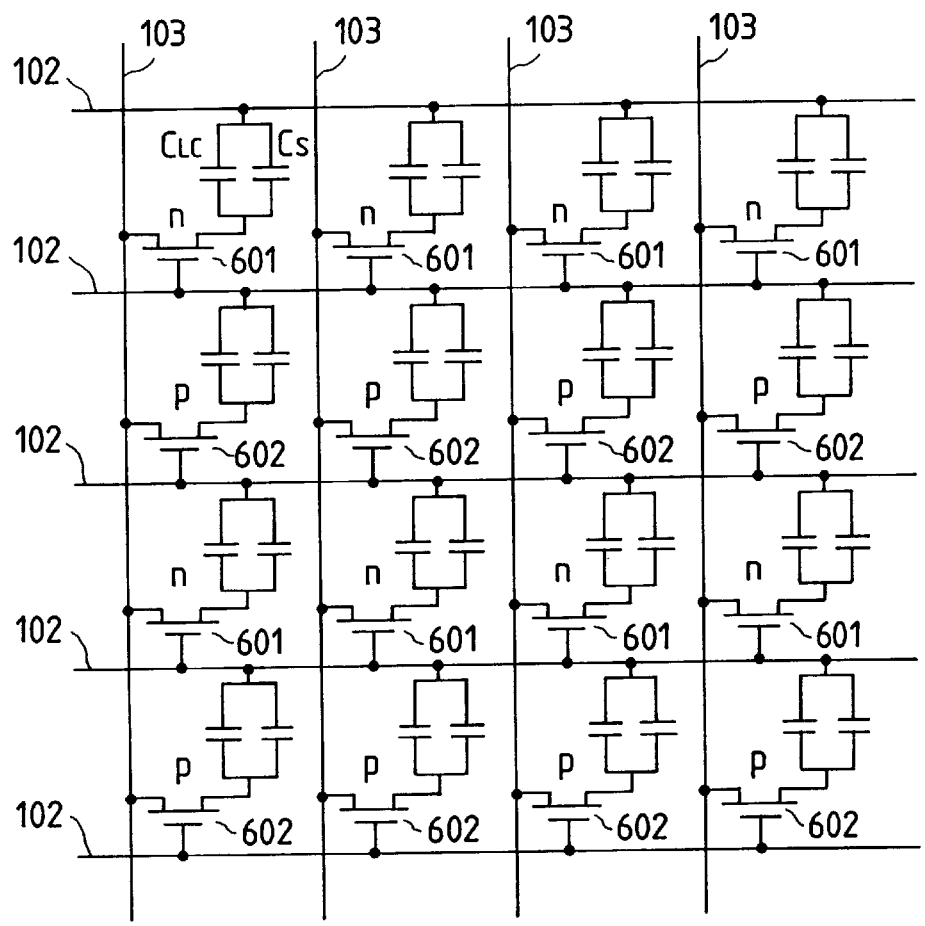
FIG. 30 is an equivalent circuit diagrams of 4×4 pixels.
Figure 31:
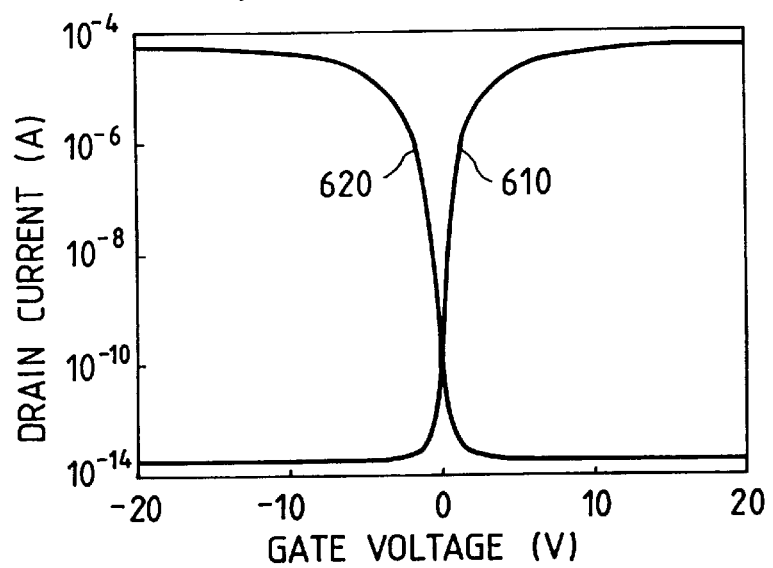
FIG. 31 is a graph indicating electric characteristics of the transistors in FIG. 30.

In a pixel array in accordance with the present invention, both thin film transistors having n-type characteristics and thin film transistors having p-type characteristics can be used. An equivalent circuit of an example of an array of 4×4 pixels in accordance with the present invention is shown in FIG. 30, and respective characteristics of the transistor elements used in the present examples are shown in FIG. 31. In accordance with the present invention, the thin film transistors 601 having n-type characteristics and the thin film transistors 602 having p-type characteristics were provided alternately in every other line.

Figure 32:
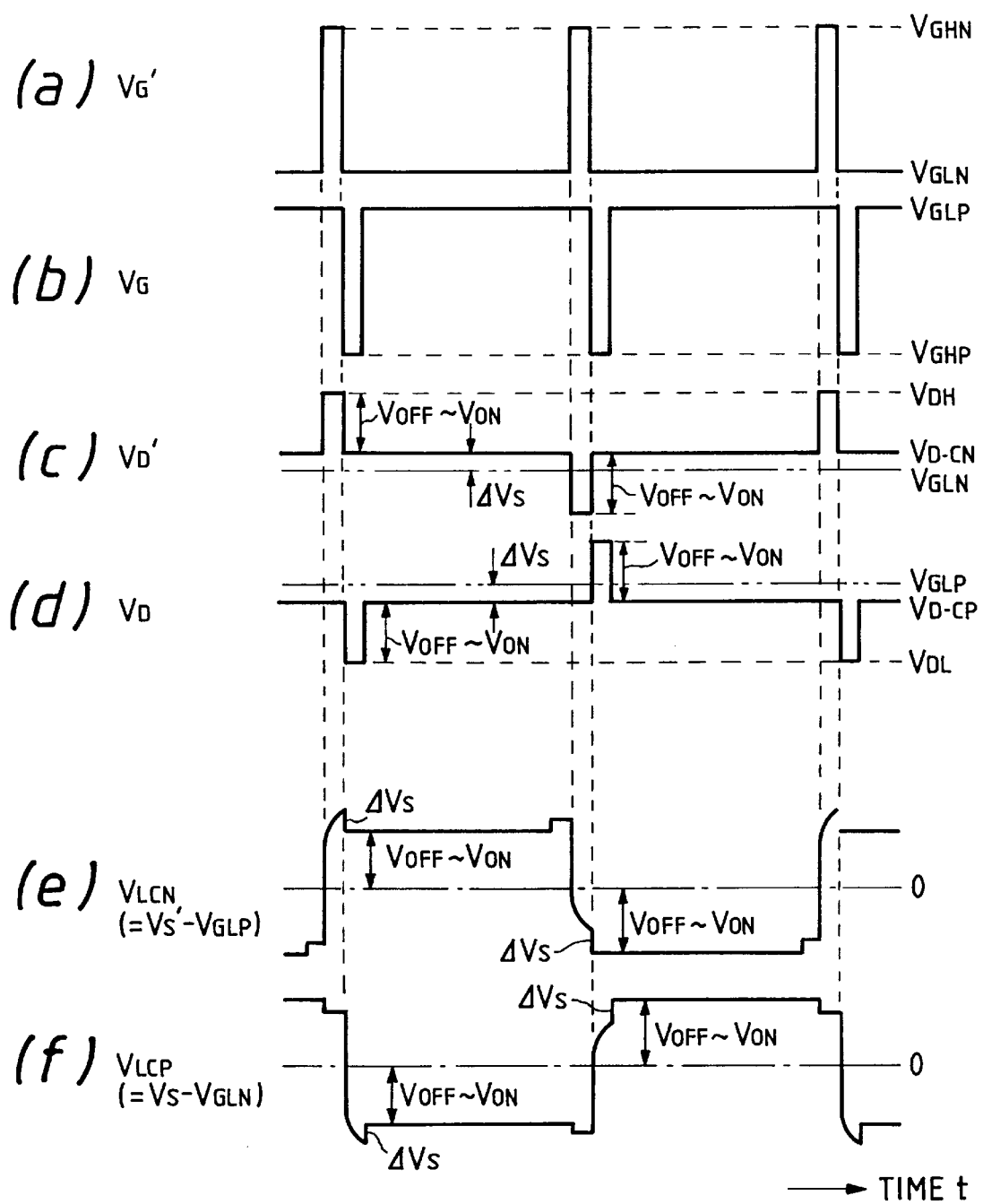
FIG. 32 is a diagram indicating waveforms of the driving voltage in FIG. 30.

Driving waveforms of the present example are shown in FIG. 32. In the present example, scan voltage waveforms for controlling respectively the thin film transistors 601 having n-type characteristics and the thin film transistors 602 having p-type characteristics were applied alternately for every other line, and the non-selective voltage $V_{GLP}$ and $V_{GLN}$ were set differently from each other. Further, the non-selective voltage $V_{GLP}$ of the scan voltage for the thin film transistor 602 having p-type characteristics was set higher than the non-selective voltage $V_{GLN}$ of the scan voltage for the thin film transistor 601 having n-type characteristics so as to satisfy the following equation:

$$|V_{GLP}-V_{GLN}| \geq |V_{ON}|.$$

As a result, the counter voltage for the pixel having the n-type thin film transistor element 601 becomes higher than the non-selective voltage of the scan voltage. Accordingly, a negative voltage can be applied to the liquid crystal in the pixel having the n-type thin film transistor element and is retained even if the gate threshold voltage $V_{TH}$ of the thin film transistor element 601 does not satisfy the condition of FIG. 1 (when $|V_{TH}|<|V_{ON}|$. On the other hand, the counter voltage for the pixel having the p-type thin film transistor element 602 becomes lower than the non-selective voltage level of the scan voltage.

In the pixel having the p-type thin film transistor element, a counter voltage lower than the non-selective voltage level of the scan voltage for the pixel having the p-type thin film transistor element 602 corresponds to a counter voltage higher than the non-selective voltage level of the scan voltage for the pixel having the n-type thin film transistor element 601 because relative polarity of the driving voltage is reversed in comparison with the pixel having the n-type thin film transistor element (that means a condition for applying and retaining a positive voltage to the liquid crystal corresponds to a condition for applying and retaining a negative voltage to the liquid crystal for the pixel having the n-type thin film transistor element 601). Even if all the thin film transistor elements have only the characteristics of either the n-type or the p-type, moderation in the condition for the gate threshold voltage $V_{TH}$ becomes possible by differentiating the non-selective voltage level of the scan voltage at every line. However, in conjunction with increasing the number of the lines, the number of voltage levels of the source power voltage of the scan voltage and the scan voltage, and a withstand voltage required to the vertical scan circuit increase remarkably, and it is impracticable.

In accordance with the present invention, the bias of the respective non-selective voltages can be cancelled at every line by repeating alternately the p-type and the n-type voltage, and respective scan voltages for the pixel group having p-type thin film transistor elements and the pixel group having n-type thin film transistor elements can be set similarly for all the lines. Therefore, even if the number of lines increases, the necessary number of voltage levels of the power source voltage for the scan voltage and the withstand voltage required for the vertical scan circuit is not increased, and the number of the voltage levels of the scan voltage can be four levels.

As described above, in accordance with the present invention, even if a thin film transistor element having a gate threshold voltage $V_{TH}$ whose absolute value is less than that of a maximum voltage applied to the liquid crystal $|V_{ON}|$, that is $|V_{TH}|<|V_{ON}|$, or having the depletion-type characteristics, a negative voltage can be applied to the liquid crystal and retained. Accordingly, the thin film transistor element having an arbitrary gate threshold voltage $V_{TH}$ can be used.

Figure 33:
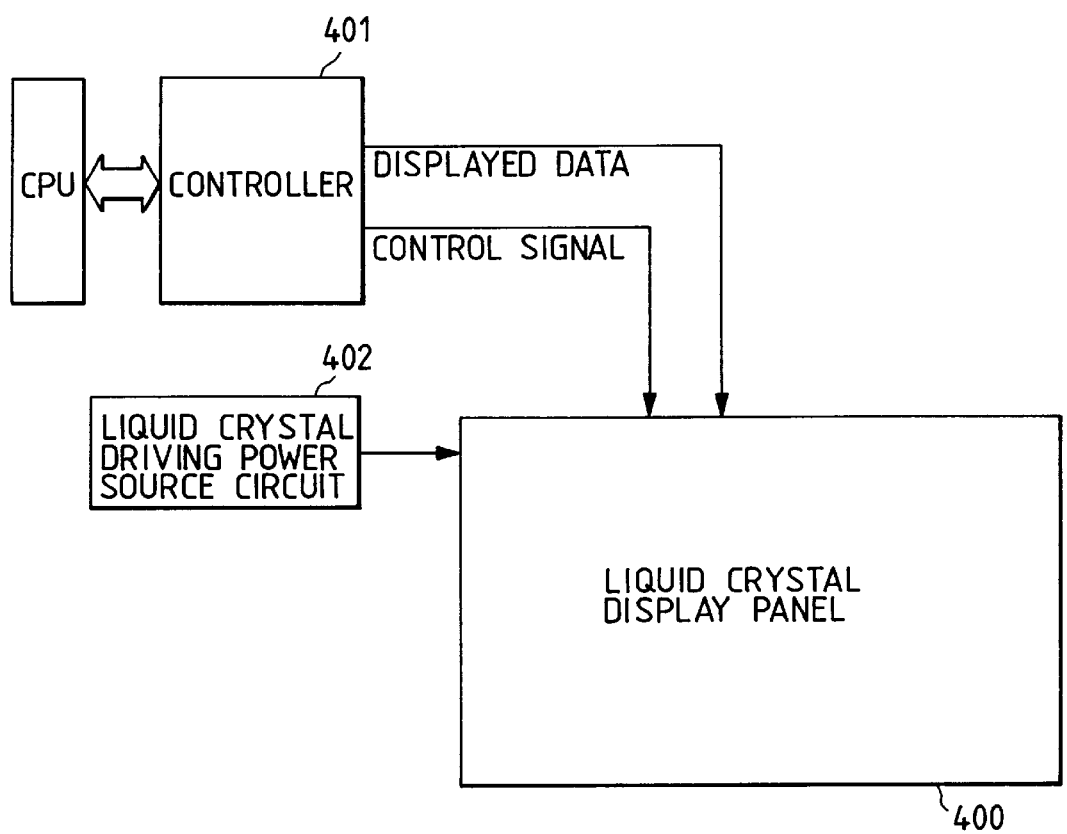
FIG. 33 is a block diagram indicating the system composition in accordance with this invention.

In an arrangement of the present invention, the image signal circuit and the vertical scan circuit are integrated in the liquid crystal panel, as shown in FIG. 33. On account of providing both the p-type thin film transistor and the n-type thin film transistor in the liquid crystal panel, a C-MOS circuit can be composed readily, and circuits having low power consumption can be integrated in the liquid crystal panel. Accordingly, connection with peripheral circuits is facilitated, and low production yield of the display apparatus caused by connection failure can be improved remarkably. Further, on account of integration of the peripheral circuits in the liquid crystal panel, the picture frame becomes slim, and a compact composition of the display apparatus could be achieved.

As described above, the present invention can provide an improved mass productivity of the display apparatus in addition to the advantages previously described with reference to FIGS. 30–32.

In accordance with the present invention, the driving method described with reference to FIG. 11 can be improved further so that the maximum operating voltage of the LSI (signal driver) for driving the signal electrode is decreased, and accordingly, reduction of the circuit scale and a decrease of the driving voltage can be achieved.

Figure 34:
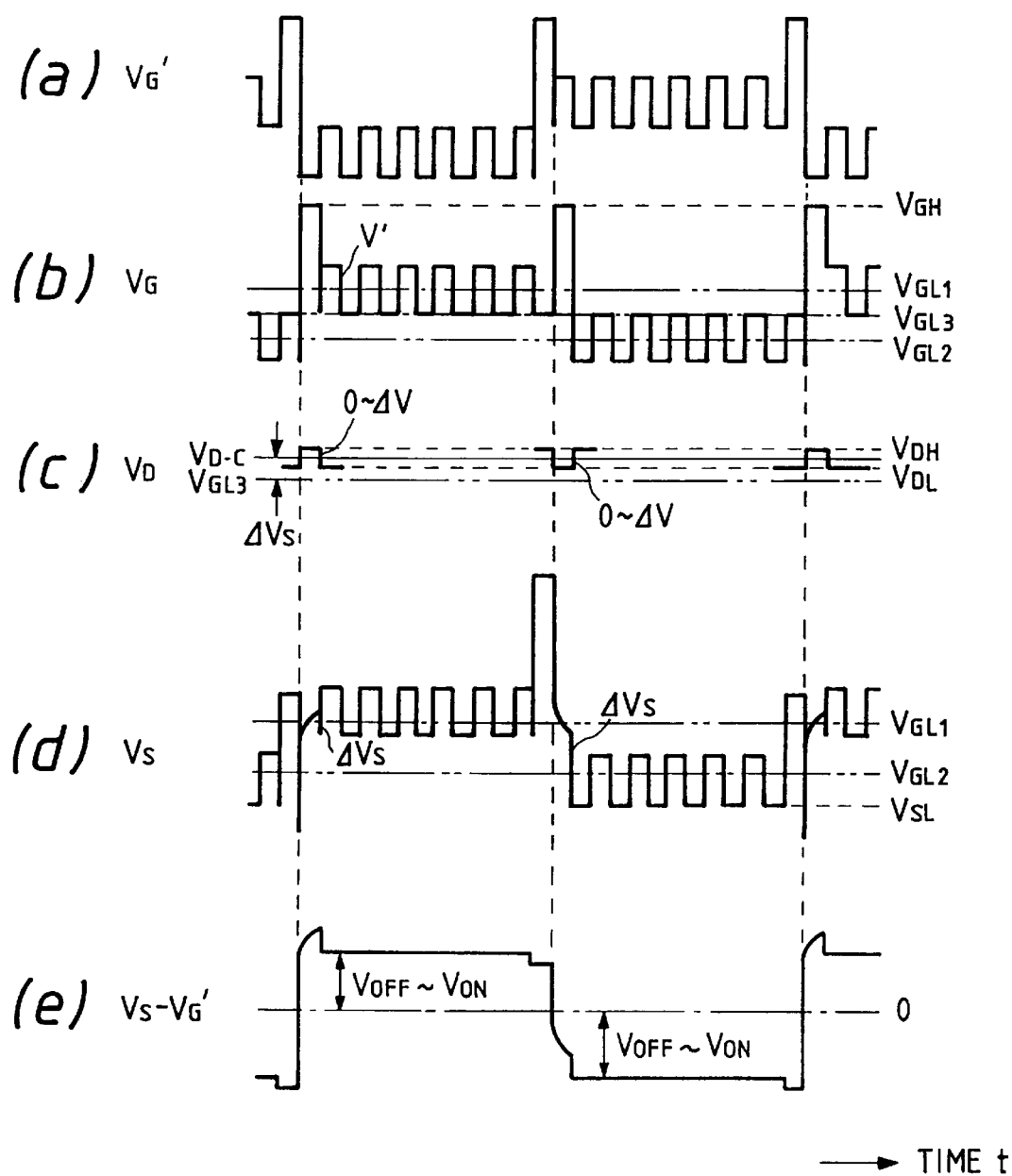
FIG. 34 is a diagram indicating waveforms of the driving voltage in accordance with the present invention.

The driving waveforms for this feature are shown in FIG. 34. The scan voltage $V_G'$ for the scan electrode in the preceding line is shown in FIG. 34(a), the scan voltage $V_G$ for the scan electrode in the circuit line is shown in FIG. 34(b), the signal voltage $V_D$ is shown in FIG. 34(c), the pixel voltage $V_S$ is shown in FIG. 34(d), and the voltage applied to the liquid crystal layer is shown in FIG. 34(e). In accordance with this driving method, two levels of voltage $V_{GL1}$ and $V_{GL2}$ are used for the non-selective voltage level of the scan voltage similar to the driving method described with reference to FIG., 11, the voltages were used alternately in every other frame, and further mutually different voltage waveforms were used alternately for every other line, and the two voltage levels were set so that the difference between the two levels of the non-selective voltage, $(V_{GL1}-V_{GL2})$, is equal to $(V_{ON}+V_{OFF})/2$. Further, a square wave which changes to alternating current at every scan period (period is two scan period, duty 50%) was overlapped to the two levels of the non-selective voltage $V_{GLH}$, $V_{GLL}$, and the amplitude of the overlapped square wave was set as $(V_{ON}+V_{OFF})/2$. Using the overlapped wave, the difference between the pixel voltage and the counter voltage, that is the voltage applied to the liquid crystal, can be increased by changing the counter voltage, and the operating range of the positive polarity of the signal voltage and the operating range of the negative polarity can be made coincident. Therefore, the maximum amplitude of the signal voltage which was applied to the signal electrode became 2.9 V $(=V_{ON}-V_{OFF})$, and could be decreased by 4.1 V in comparison with 7.0 V $(=(3V_{ON}-V_{OFF})/2)$ in the driving method of FIG. 11. Accordingly, an LSI having a withstand voltage of 5.0 V or 3.3 V which was manufactured by a process for general use could be used for the signal driver, and consequently, the cost could be decreased significantly, and the power consumption could be reduced to approximately 10% of the example of FIG. 1.

Figure 35:
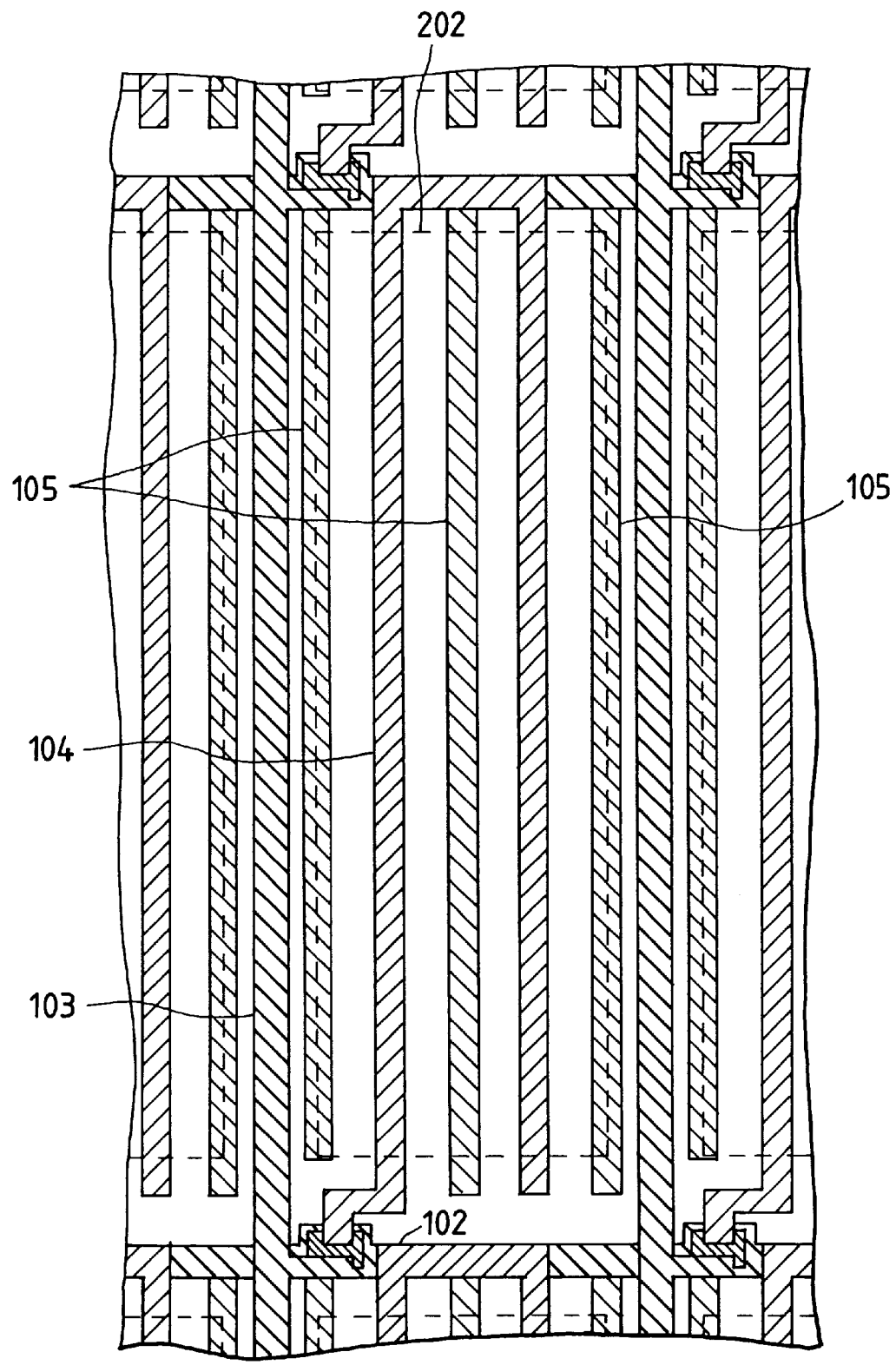
FIG. 35 is a partial plane view indicating the composition of the pixel portion of the present invention.

A plane view of an example of a thin film transistor and various electrodes in accordance with the present invention is shown in FIG. 35. In the present example, the counter electrode 105 is composed so as to be adjacent to the signal electrode, and the counter electrode 105 is arranged between the signal electrode 103 and the pixel electrode 104.

In this example, most of the lines of electric force come from the signal electrode end at the counter electrode 105 because the counter electrode is arranged between the signal electrode 103 and the pixel electrode 104. Since the potential from the vertical scan circuit 403 is applied to the scan electrode 102 so that the non-selective voltage level becomes constant during almost all of the period except for a period for charging the current line, the scan electrode 102 absorbs any voltage fluctuation of the signal electrode, and an effect of voltage fluctuation of the signal electrode on the voltage of the pixel electrode is decreased significantly. Therefore, even if the voltage of the signal electrode fluctuates depending on the image signal, the voltage of the pixel electrode does not change, and accordingly, cross talk between the signal electrode and the pixel electrode, especially a stripe-shaped image quality failure (vertical smear) generated in a longitudinal direction of the signal electrode can be eliminated.

As explained above, similar advantages as discussed with reference to FIG. 1 can be obtained by the present example, and further, an active matrix type liquid crystal display apparatus having a high image quality without cross talk can be obtained.

Further, an effect relating to orientation failure in the present example is different from that of the example of FIG. 1 because the arrangement of the electrodes are different. In accordance with the present invention, the counter electrode 105 and the scan electrode 102, which is not connected to the counter electrode 105, are arranged adjacently, but as the counter voltage and the scan voltage coincide mutually during most of the operating period, substantially no potential is applied to the region between the counter electrode and the scan electrode. Accordingly, if the display characteristics of normally close is selected similar to the example of FIG. 1, the above region does not transmit light, and consequently, shielding of the region becomes unnecessary. A voltage is applied to the region between the pixel electrode 104 and the scan electrode 102 depending on the pixel voltage similar to the region between the pixel electrode 104 and the counter electrode 105, and further, when an image signal voltage for a black display, which means no transmittance of light, is applied to the pixel electrode, a high quality black state is obtained even if the region is not shielded, and the contrast ratio does not decrease. Therefore, as a shielding film is not necessary for the region, the boundary of the shielding film can be widened and the aperture region can be enlarged.

Further, the structure of an example of a thin film transistor and various electrodes in accordance with the present invention is shown in FIGS. 37(a) to 37(c); wherein, FIG. 37(a) is a plane view from the vertical direction to the substrate, and FIGS. 37(b) and (c) are cross sectional views taken along the line B–B' and A–A' in FIG. 37(a). The thin film transistor element 150 comprises the pixel electrode (source electrode) 104, the signal electrode (drain electrode) 103, the scan electrode (gate electrode) 102, the semiconductor layer composed of amorphous silicon 106, and the gate insulator 101. The thin film transistor has a staggered structure, the scan electrode 102 is formed in the lowest layer, and the signal electrode 103 and the pixel electrode 104 are composed by forming patterns with a same metallic layer. The storage capacitance 160 is formed so as to have a structure wherein the gate insulator 101 was held between the pixel electrode 104 and the scan electrode 102 in the preceding line. The pixel electrode 104 is arranged between projections 105 which extends from the scan electrode 102 in a vertical direction as shown in FIG. 37(a). Orientation of the liquid crystal molecules in the liquid crystal layer is mainly controlled by an electric field E in a horizontal direction between the pixel electrode 104 and the projection 105. Light transmits through a region between the pixel electrode 104 and the projection 105, and the light is projected into the liquid crystal layer and modulated. In this arrangement, the longitudinal direction of the signal electrode is defined as the vertical direction, and the longitudinal direction of the scan electrode is defined as the horizontal direction. Further, the projection is extruded from the scan electrode in the preceding line, but it can be extruded from the scan electrode in the subsequent line.

The pixel pitch was selected as 110 $\mu$m in the horizontal direction (that is between the signal electrodes), and 330 $\mu$m in the vertical direction (that is between the scan electrodes). The widths of the electrodes were selected as 10 $\mu$m for the scan electrode and 9 $\mu$m for the signal electrode. The widths of the pixel electrode and the projection portion 105 from the scan electrode 102 in the preceding line were respectively 8 $\mu$m. An interval between the pixel electrode 105 and the signal electrode was set as 6 $\mu$m. The widths of the electrodes were set so that an electrode gap $d_{sG}$ between the pixel electrode 104 and the projection portion 105 became 12 $\mu$m when the interval between the pixel electrode 104 and the projection portion 105 was divided into four portions. In order to improve the contrast ratio, an insulating black matrix is formed at unnecessary intervals (other than the interval between the pixel electrode 104 and the projection portion 105).

In the present example, the pixel is divided into four portions. However, the number of divisions is not restricted to four, but the only requirements is that the electrodes must be composed so that the condition of the present invention relating to the electrode gap $d_{sG}$ is satisfied.

Figure 38A:
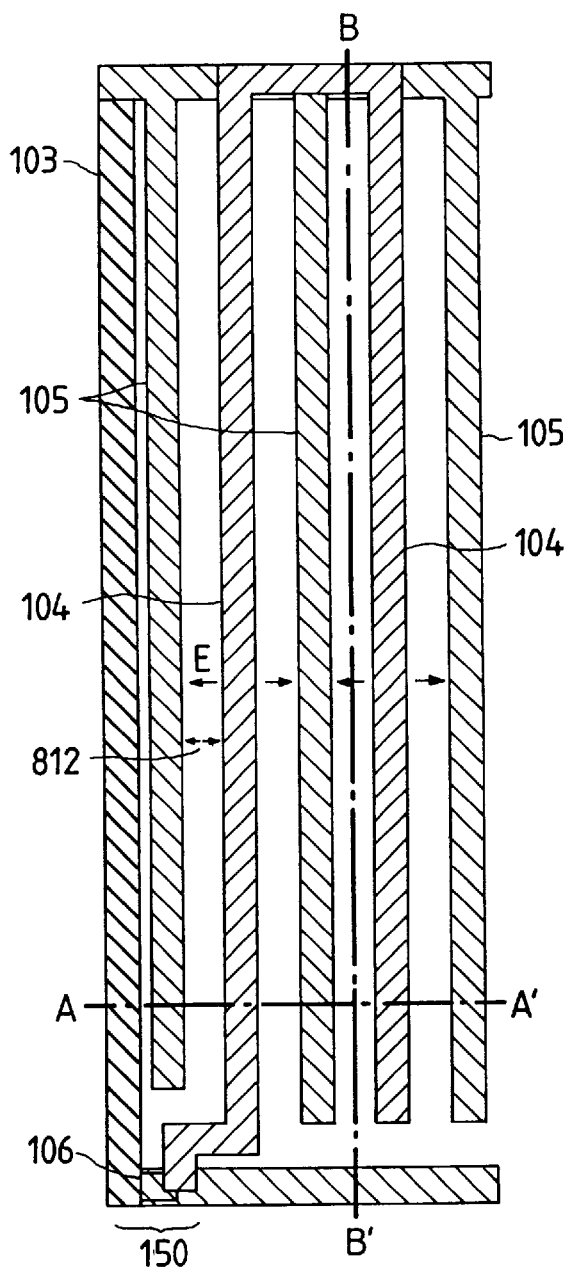
FIG. 38(a) is a plan view.
Figure 38B:
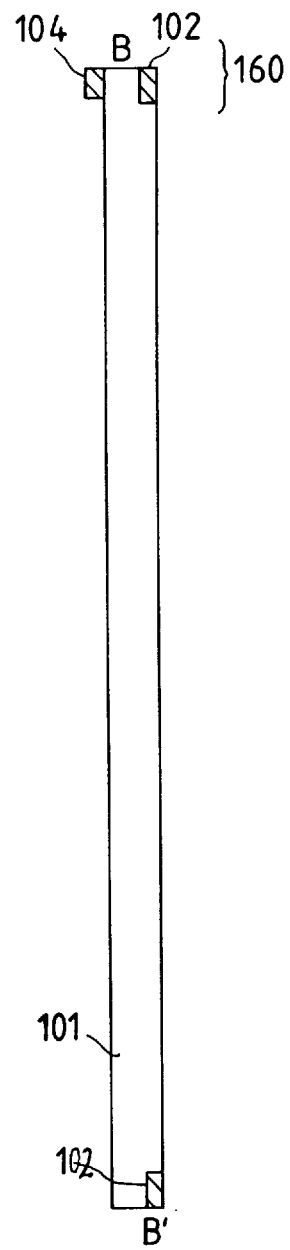
FIG. 38(b) is a side view and FIG. 38(c) is an end view for explaining the composition of the pixel portion of the present invention.
Figure 38C:
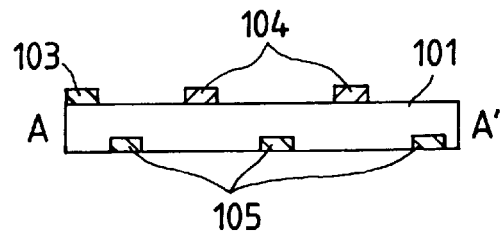

A plane view of another example of a thin film transistor and various electrodes in accordance with the present invention is shown in FIGS. 38(a) to 38(c); wherein, FIG. 38(a) is a plane view from the vertical direction to the substrate, and FIGS. 38(b) and (c) are cross sectional views taken along the line B–B' and A–A' in FIG. 38(a). In the present example, the projection was composed in a vertical direction from the scan electrode 102 so as to be adjacent to the signal electrode.

In this arrangement, the projection portion 105 from the scan electrode was arranged between the signal electrode 103 and the pixel electrode 104. In this case, the widths of the electrodes were selected as respectively 10 $\mu$m for the scan electrode and the signal electrode, and respectively 9 $\mu$m for the pixel electrode and the projection portion 105 of the scan electrode 102. Therefore, the electrode gap $d_{Gg}$ between the pixel electrode 104 and the projection portion 105 became 12 $\mu$m similar to FIG. 38(a).

On account of arranging the projection portion 105 of the scan electrode 102 between the signal electrode 103 and the pixel electrode 104, most of the lines of electric force come from the signal electrode end at the projection portion of the scan electrode. The scan electrode 102 is supplied with a potential from the scan circuit driver so that the off-voltage becomes constant during almost all of the period except during charging of the current line, the scan electrode 102 absorbs any voltage fluctuation of the signal electrode, and an effect of voltage fluctuation of the signal electrode on the voltage of the pixel electrode is decreased significantly. Therefore, even if the voltage of the signal electrode fluctuates depending on the image signal, the voltage of the pixel electrode does not change, and accordingly, cross talk between the signal electrode and the pixel electrode, especially a stripe-shaped image quality failure (vertical smear) generated in a vertical direction of the signal electrode can be eliminated.

As explained above in detail, in accordance with the present invention, an active matrix type liquid crystal display apparatus having a high aperture ratio can be obtained by reducing the amount of wiring and decreasing the orientation failure domain in a display method wherein an electric field parallel to the substrate is applied to the liquid crystal for modulating light. Concurrently, an active matrix type liquid crystal display apparatus which is mass producible with a high production yield can be obtained by reducing the amount of the wiring. Further, an active matrix type liquid crystal display apparatus can be obtained, which has a long life because it is driven by an alternating current, and has a preferable image quality with no generation of residual image.

What is claimed is:

1. An active matrix type liquid crystal display apparatus comprising:
    a pair of substrates;
    a liquid crystal layer enclosed between said pair of substrates;
    wherein one substrate of said pair of substrates has formed thereon:
        (a) a plurality of scan electrodes;
        (b) a plurality of signal electrodes formed so as to cross said plurality of scan electrodes,
        (c) a plurality of transistors formed at respective crossing points of said plurality of scan electrodes and said plurality of signal electrodes,
        (d) a plurality of pixel electrodes, respective ones of said plurality of pixel electrodes being connected to respective ones of said plurality of transistors, and
        (e) a plurality of counter electrodes which are individually connected to respective ones of said scan electrodes and which generate an electric field predominantly parallel to said pair of substrates and arranged between said plurality of pixel electrodes; and
    wherein a plurality of back plane electrodes, whereto electrons are infected, are formed on or under at least one of said plurality of signal electrodes or said plurality of scan electrodes.

2. An active matrix type liquid crystal display apparatus as claimed in claim 1, wherein said plurality of back plane electrodes are formed on and under one of said plurality of signal electrodes and said plurality of scan electrode.

3. An active matrix type liquid crystal display apparatus as claimed in claim 1, wherein an insulating film is provided between respective ones of said plurality of back plane electrodes and respective ones of said plurality of signal electrodes.

4. An active matrix type liquid crystal display apparatus as claimed in claim 1, wherein said plurality of back plane electrodes are light shielding electrodes.

5. An active matrix type liquid crystal display apparatus as claimed in claim 1, wherein said plurality of back plane electrodes are formed on said plurality of transistors.

6. An active matrix type liquid crystal display apparatus as claimed in claim 1, further comprising a device to supply a voltage to said plurality of back plane electrodes.

7. An active matrix type liquid crystal display apparatus as claimed in claim 6, wherein said device to supply a voltage to said plurality of back plane electrodes is a driving circuit.

8. An active matrix type liquid crystal display apparatus as claimed in claim 1, wherein said plurality of transistors are positive stagger type transistors.

9. An active matrix type liquid crystal display apparatus as claimed in claim 1, wherein said plurality of back plane electrodes are floating electrodes.

10. An active matrix type liquid crystal display apparatus comprising:
    a pair of substrates;
    a liquid crystal layer enclosed between said pair of substrates;
    wherein one substrate of said pair of substrates has formed thereon:
        (a) a plurality of scan electrodes;
        (b) a plurality of signal electrodes formed so as to cross said plurality of scan electrodes,
        (c) a plurality of enhancement transistors formed at respective crossing points of said plurality of scan electrodes and said plurality of signal electrodes,
        (d) a plurality of pixel electrodes, respective ones of said plurality of pixel electrodes being connected to respective ones of said plurality of enhancement transistors, and
        (e) a plurality of counter electrodes which are individually connected to respective ones of said scan electrodes and which generate an electric field predominantly parallel to said pair of substrates and arranged between said plurality of pixel electrodes;
    wherein respective ones of said plurality of enhancement transistors comprise a SiON film.

11. An active matrix type liquid crystal display apparatus comprising:
    a pair of substrates;
    a liquid crystal layer enclosed between said pair of substrates;
    wherein one substrate of said pair of substrates has formed thereon:
        (a) a plurality of scan electrodes;
        (b) a plurality of signal electrodes formed so as to cross said plurality of scan electrodes,
        (c) a plurality of transistors formed at respective crossing points of said plurality of scan electrodes and said plurality of signal electrodes,
        (d) a plurality of pixel electrodes, respective ones of said plurality of pixel electrodes being connected to respective ones of said plurality of transistors, and
        (e) a plurality of counter electrodes which are individually connected to respective ones of said scan electrodes and which generate an electric field predominantly parallel to said pair of substrates and arranged between said plurality of pixel electrodes;
    wherein respective ones of said plurality of transistors comprise a SiO film and a SiN film.

12. An active matrix type liquid crystal display apparatus comprising:
    a pair of substrates;
    a liquid crystal layer enclosed between said pair of substrates;
    wherein one substrate of said pair of substrates has formed thereon:
        (a) a plurality of scan electrodes;
        (b) a plurality of signal electrodes formed so as to cross said plurality of scan electrodes, (c) a plurality of transistors formed at respective crossing points of said plurality of scan electrodes and said plurality of signal electrodes, crossing points associated with a same scan electrode are disposed as a line of crossing points, (d) a plurality of pixel electrodes, respective ones of said plurality of pixel electrodes being connected to respective ones of said plurality of transistors, and (e) a plurality of counter electrodes, at least one of which is provided at each of said crossing points, ones of said counter electrodes associated with a line of crossing points being connected to a scan electrode associated with another, adjacently disposed line of crossing points, and said counter electrodes generating an electric field predominantly parallel to said pair of substrates and being arranged at spacings between said plurality of pixel electrodes; and wherein a plurality of back plane electrodes, whereto electrons are injected, are formed on or under at least one of said plurality of signal electrodes or said plurality of scan electrodes.

13. An active matrix type liquid crystal display apparatus as claimed in claim 12, wherein said plurality of back plane electrodes are formed on and under one of said plurality of signal electrodes and said plurality of scan electrodes.

14. An active matrix type liquid crystal display apparatus as claimed in claim 12, wherein an insulating film is provided between respective ones of said plurality of back plane electrodes and respective ones of said plurality of signal electrodes.

15. An active matrix type liquid crystal display apparatus as claimed in claims 12, wherein said plurality of back plane electrodes are light shielding electrodes.

16. An active matrix type liquid crystal display apparatus as claimed in claim 12, wherein said plurality of back plane electrodes are formed on said plurality of transistors.

17. An active matrix type liquid crystal display apparatus as claimed in claim 12, further comprising a device to supply a voltage to said plurality of back plane electrodes.

18. An active matrix type liquid crystal display apparatus as claimed in claim 17, wherein said device to supply a voltage to said plurality of back plane electrodes is a driving circuit.

19. An active matrix type liquid crystal display apparatus as claimed in claim 12, wherein said plurality of transistors are positive stagger type transistors.

20. An active matrix type liquid crystal display apparatus as claimed in claim 12, wherein said plurality of back plane electrodes are floating electrodes.

21. An active matrix type liquid crystal display apparatus comprising:

a pair of substrates;

a liquid crystal layer enclosed between said pair of substrates;

wherein one substrate of said pair of substrates has formed thereon:

(a) a plurality of scan electrodes;

(b) a plurality of signal electrodes formed so as to cross said plurality of scan electrodes, (c) a plurality of enhancement transistors formed at respective crossing points of said plurality of scan electrodes and said plurality of signal electrodes, crossing points associated with a same scan electrode are disposed as a line of crossing points, (d) a plurality of pixel electrodes, respective ones of said plurality of pixel electrodes being connected to respective ones of said plurality of enhancement transistors, and (e) a plurality of counter electrodes, at least one of which is provided at each of said crossing points, ones of said counter electrodes associated with a line of crossing points being connected to a scan electrode associated with another, adjacently disposed line of crossing points, and said counter electrodes generating an electric field predominantly parallel to said pair of substrates and being arranged at spacings between said plurality of pixel electrodes;

wherein respective ones of said plurality of enhancement transistors comprise a SiON film.

22. An active matrix type liquid crystal display apparatus comprising:

a pair of substrates;

a liquid crystal layer enclosed between said pair of substrates;

wherein one substrate of said pair of substrates has formed thereon:

(a) a plurality of scan electrodes;

(b) a plurality of signal electrodes formed so as to cross said plurality of scan electrodes, (c) a plurality of transistors formed at respective crossing points of said plurality of scan electrodes and said plurality of signal electrodes, crossing points associated with a same scan electrode are disposed as a line of crossing points, (d) a plurality of pixel electrodes, respective ones of said plurality of pixel electrodes being connected to respective ones of said plurality of transistors, and (e) a plurality of counter electrodes, at least one of which is provided at each of said crossing points, one of said counter electrodes associated with a line of crossing points being connected to a scan electrode associated with another, adjacently disposed line of crossing points, and said counter electrodes generating an electric field predominantly parallel to said pair of substrates and being arranged at spacings between said plurality of pixel electrodes;

wherein respective ones of said plurality of transistors comprise a SiO film and a SiN film.

* * * * *